US010084966B2

(12) United States Patent
Burgess

(10) Patent No.: US 10,084,966 B2
(45) Date of Patent: Sep. 25, 2018

(54) METHODS AND APPARATUS FOR SYNCHRONIZING MULTIPLE LENS SHUTTERS USING GPS PULSE PER SECOND SIGNALING

(71) Applicant: Red Hen Systems LLC, Fort Collins, CO (US)

(72) Inventor: Ken Lloyd Burgess, Fort Collins, CO (US)

(73) Assignee: Red Hen Systems LLC, Fort Collins, CO (US)

( * ) Notice: Subject to any disclaimer, the term of this patent is extended or adjusted under 35 U.S.C. 154(b) by 0 days.

(21) Appl. No.: 15/386,605

(22) Filed: Dec. 21, 2016

(65) Prior Publication Data
US 2018/0176441 A1    Jun. 21, 2018

(51) Int. Cl.
H04N 5/235    (2006.01)
B64C 39/02    (2006.01)
B64D 47/08    (2006.01)
G01S 19/14    (2010.01)

(52) U.S. Cl.
CPC ......... *H04N 5/2353* (2013.01); *B64C 39/024* (2013.01); *B64D 47/08* (2013.01); *G01S 19/14* (2013.01); *B64C 2201/127* (2013.01)

(58) Field of Classification Search
CPC .................................................... H04N 5/2353
USPC ............................................. 348/211.3, 296
See application file for complete search history.

(56) References Cited

U.S. PATENT DOCUMENTS

| 6,211,906 B1* | 4/2001 | Sun ........................... G01J 3/26 348/143 |
| 6,741,790 B1 | 5/2004 | Burgess |
| 6,904,160 B2 | 6/2005 | Burgess |
| 2016/0257424 A1* | 9/2016 | Stabler ................... A63H 27/12 |

OTHER PUBLICATIONS

Nick Holliman "Mapping Perceived Depth to Regions of Interest of Stereoscopic Images" http://www.comp.leeds.ac.uk/edemand/publications/hol04a.pdf.
Patrik Kamencay et al. "Improved Depth Map Estimation from Stereo Images Based on Hybrid Method," http://www.radioeng.cz/fulltexts/2012/_01_0070_0078.pdf.
Guidi et al., "Resolution Characterization of 3D Cameras," SPIE-IST&T vol. 7239 http://www.academia.edu/416412/Guidi_G._Russo_M._Magrassi_G._Bordegoni_M._2009_Resolution_Characterization_of_3D_cameras.
http://3dstereophoto.blogspot.com/p/software.html.
http://3dstereophoto.blogspot.com/2014/02/depth-map-automatic-generator-4-dmag4.html.
http://www.gimpel3d.com/; http://www.3dphoto.net/forum/index.php?topic=8877.0.
http://www.l-art3d.com/Eng/About_Depth.htm (Continued)

*Primary Examiner* — Joel Fosselman
(74) *Attorney, Agent, or Firm* — Jennings, Strouss & Salmon PLC; Michael K. Kelly; Daniel R. Pote

(57) ABSTRACT

Systems, devices, and methods for synchronizing the operation of a first shutter of a first camera with the operation of a second shutter of a second camera without a physical tether between the first and second cameras. The method includes: receiving a global positioning system (GPS) pulse-per-second (PPS) signal at the first and second cameras; and in response to a unique timing pulse in the PPS signal, simultaneously actuating the first and second shutters.

16 Claims, 14 Drawing Sheets

(56) References Cited

OTHER PUBLICATIONS

Shmuel Peleg et al., "Stereo Panorama with a Single Camera," Institute of Computer Science at the Hebrew University of Jerusalem http://www.cs.huji.ac.il/~peleg/papers/cvpr99-stereopan.pdf.

Wang et al., "Study on Clear Stereo Image Pair Acquisition Method for Small Objects with Big Vertical Size in SLM Vision System" https://www.ncbi.nlm.nih.gov/pubmed/26970109.

"Photogrammetry" http://tx.technion.ac.il/~dalyot/docs/Intro-Photogrammetry.pdf.

Matt Vitelli and Saumitro Dasgupta, "Deep Stereo Dense Depth Estimation from Stereo Image Pairs Using Convolutional Neural Networks" http://cs231n.stanford.edu/reports/saumitro-mvitelli-final-report.pdf.

"Computer Vision System Toolbox" https://www.mathworks.com/products/computer-vision/features.html?requestedDomain.www.mathworks.com.

"Stereoscopy & Height Measurement" http://www.geog.ucsb.edu/~jeff/115a/lectures/stereoscopy_and_height_measurement.html.

Talbot, Andrew, G4JNT. "Probably The' Simplest GPS Disciplined Oscillator Possible!"; p. 1 http://gpsdo.i2phd.com/.

Rocky Mountain Memories 3D Encyclopedia; "Twin Camera Shutter Synchronization"; pp. 1-2 http://www.rmm3d.com/3d.encyclopedia/twin.camera/sync.html.

"Stereoscopy"; Wikipedia; pp. 1-15 http://en.wikipedia.org/wiki/Stereoscopy.

Griffin, Darren; "How Does the Global Positioning System Work?"; pp. 1-4 http://www.pocketgpsworld.com/howgrpsworks.php.

Arduino IMU: Pitch & Roll Estimation from an Accelerometer—The C Continuum https://theccontinuum.com/2012/09/24/arduino-imu-pitch-roll-from-accerlerometer/.

Pulse-per-second signal; Wikipedia; pp. 1-2 http://en.wikipedia.org/wiki/Pulse-per-second_signal.

GPS Time and Frequency Reference Receiver 58540A; Symmetricom; pp. 1-7 http://www.symmetricom.com.

Spicer, Steve; "Digital Photography and Ortho-Stereo", technical paper not published; Jun. 2008; pp. 1-6.

* cited by examiner

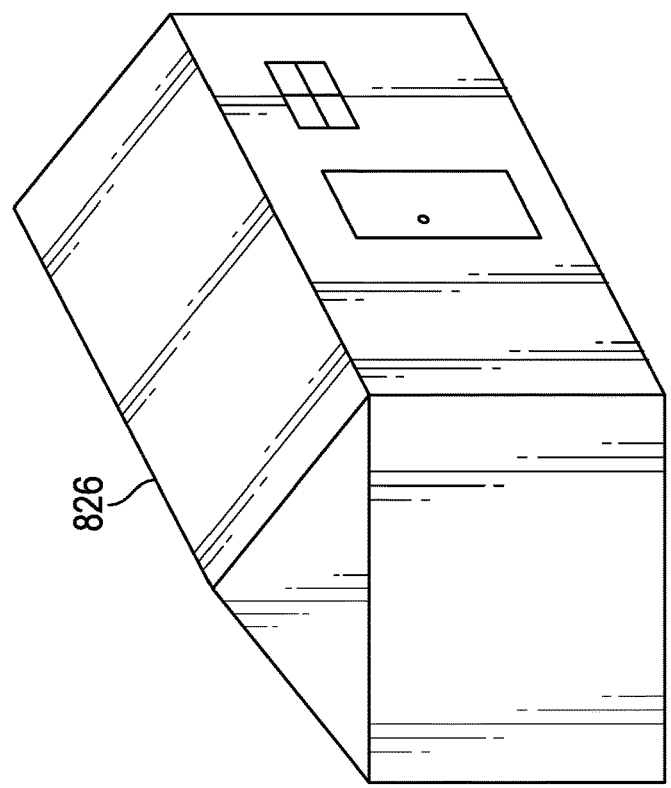
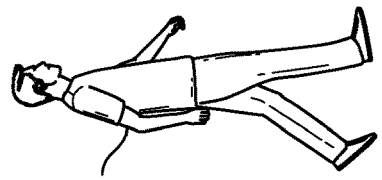
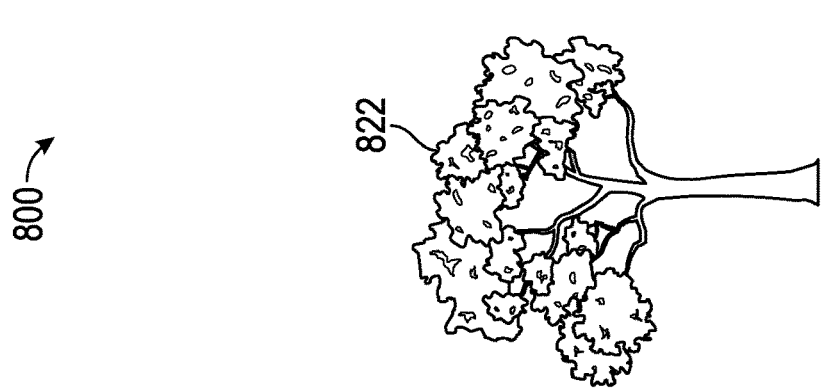
FIG. 8

METHODS AND APPARATUS FOR SYNCHRONIZING MULTIPLE LENS SHUTTERS USING GPS PULSE PER SECOND SIGNALING

TECHNICAL FIELD

The present invention relates, generally, to techniques for synchronizing lens shutters in multiple cameras and, more particularly, to the use of the Global Positioning Signal (GPS) Pulse Per Second (PPS) signal to synchronize shutters without the need for a genlock tether.

BACKGROUND

Presently known techniques for synchronizing the shutters of multiple cameras require the use of a physical tether extending between the cameras, or otherwise establishing a genlock configuration in which a master camera controls the shutters of one or more slave cameras. Consequently, the distance between the cameras is limited by the length of the tether.

Improved systems and methods are thus needed which overcome the foregoing limitations.

BRIEF SUMMARY OF THE INVENTION

The present invention relates to the use of an external timing signal to precisely control the operation of multiple camera shutters, eliminating the need for a physical tether. In an embodiment, the pulse-per-second (PPS) component of a global positioning system (GPS) signal serves as the external timing channel.

Various other embodiments, aspects and features of the present invention are described in more detail below. Additional features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and:

Figure 4:
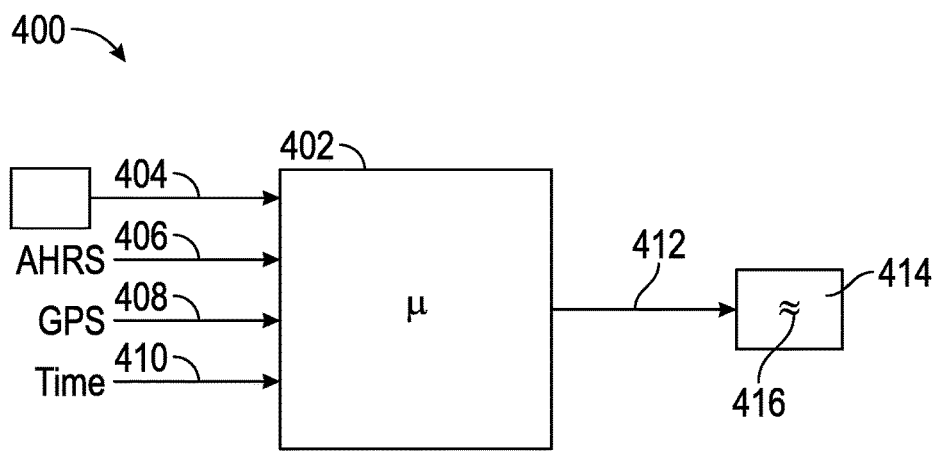
Figure 5:
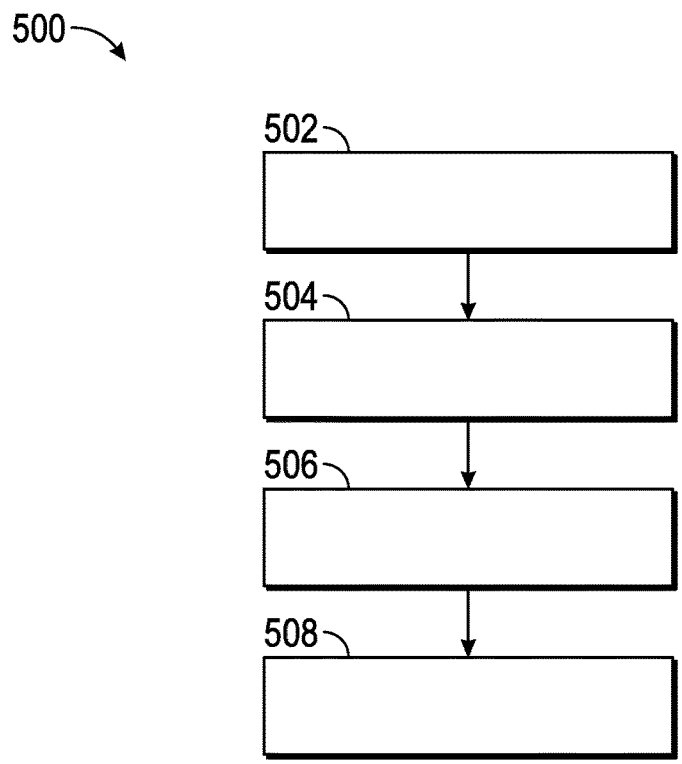
Figure 6:
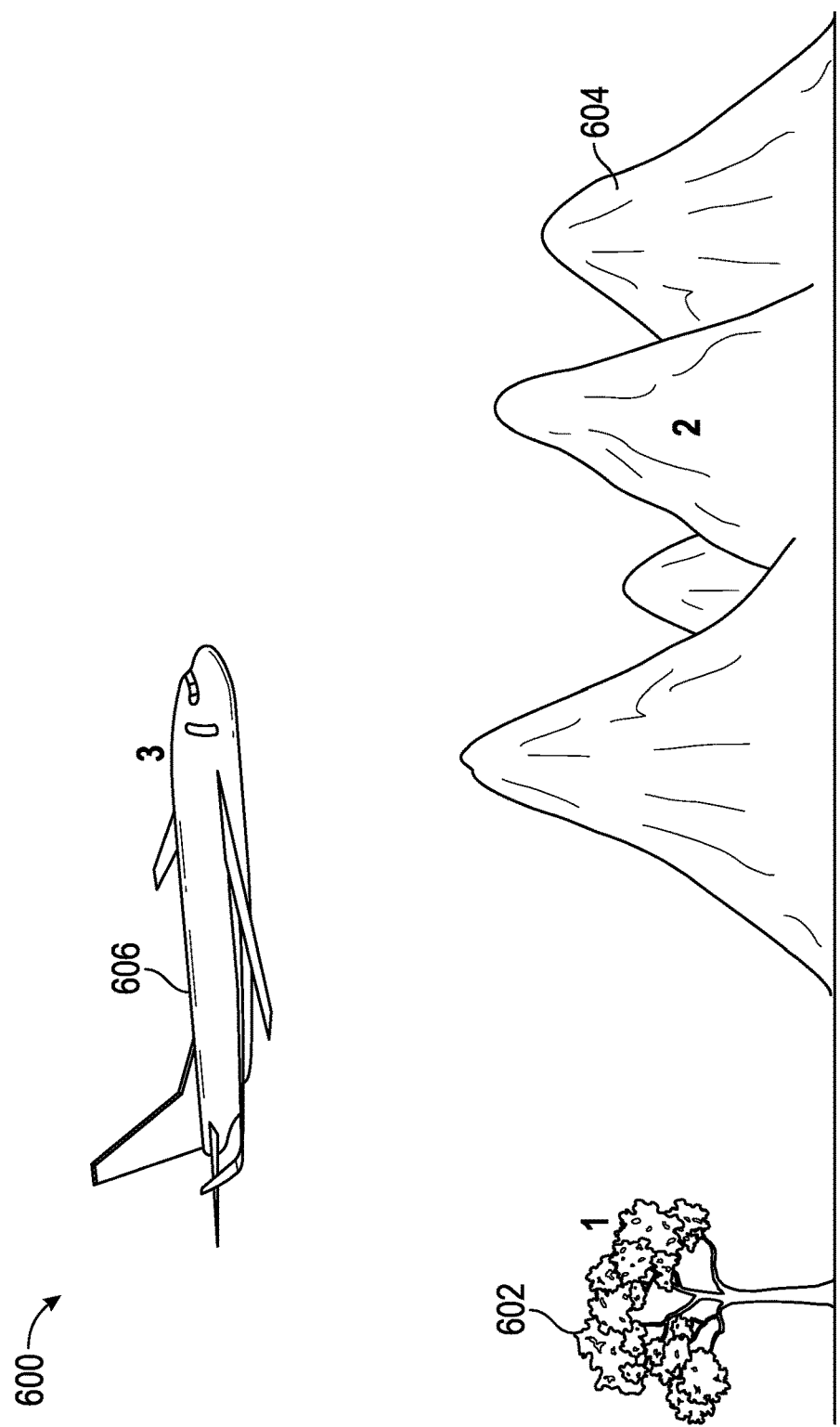
Figure 7:
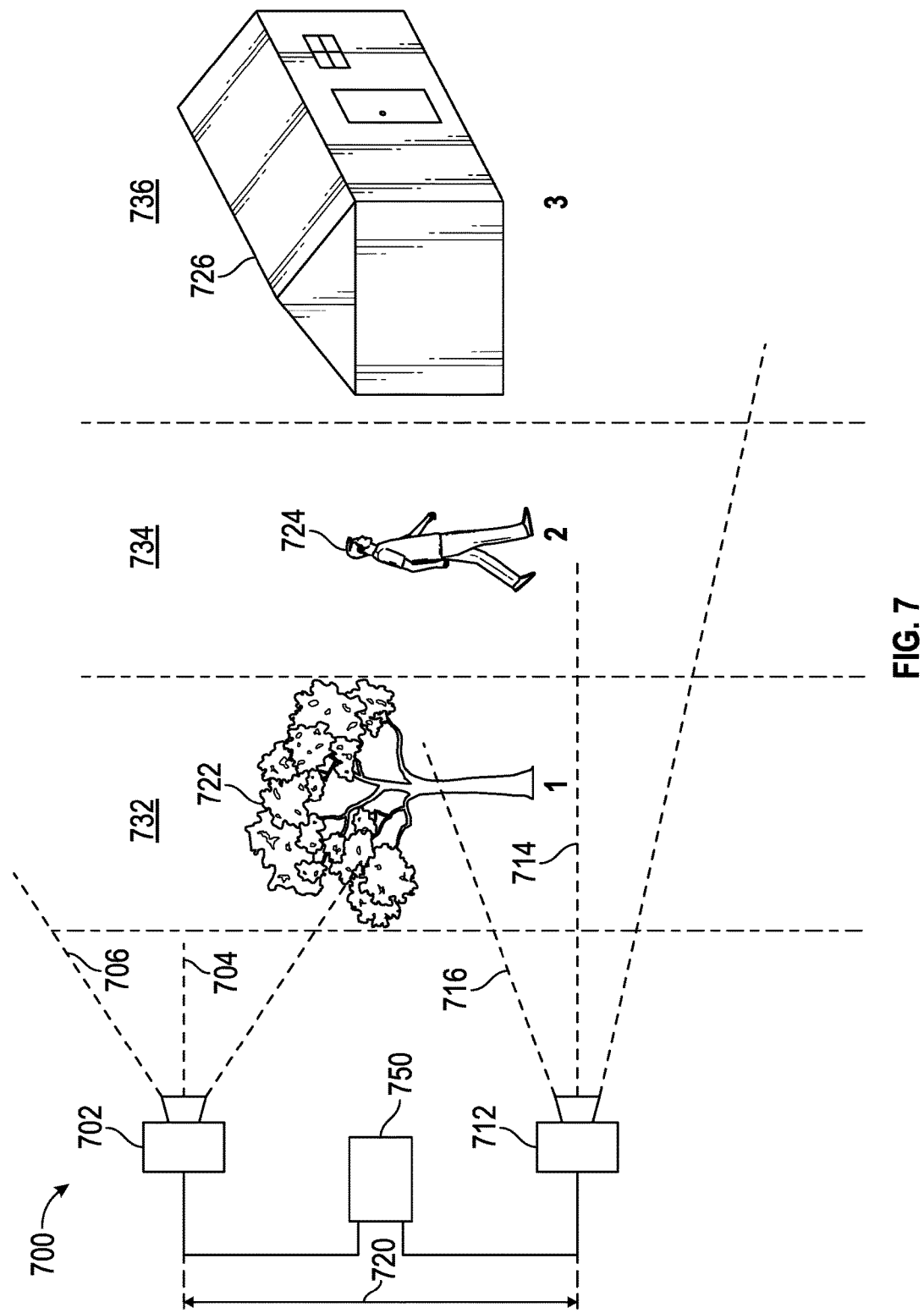
Figure 9:
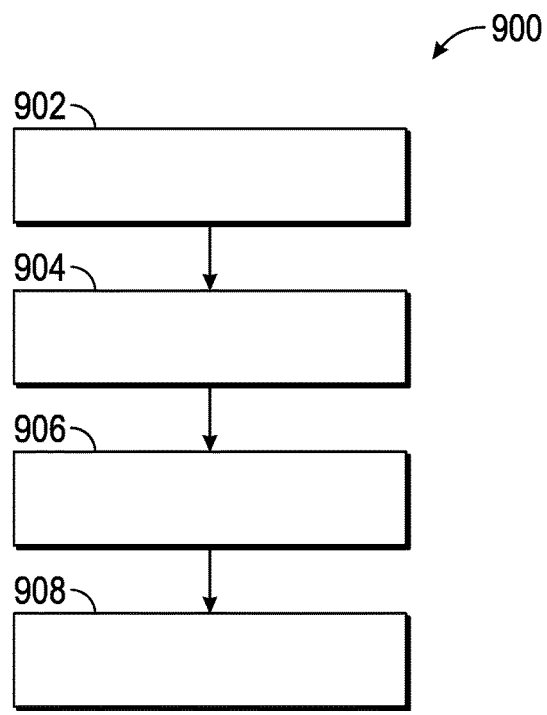
Figure 10:
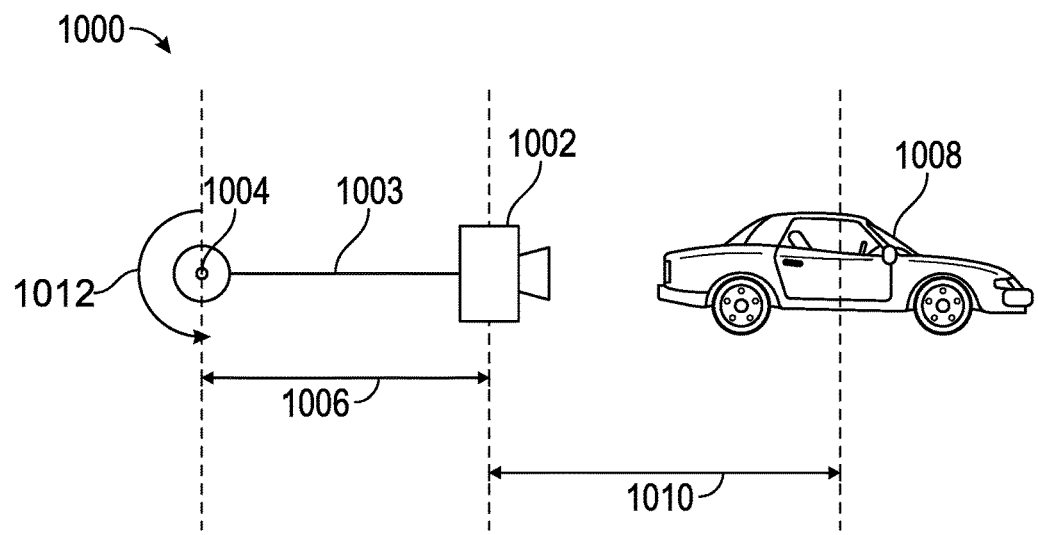
Figure 11:
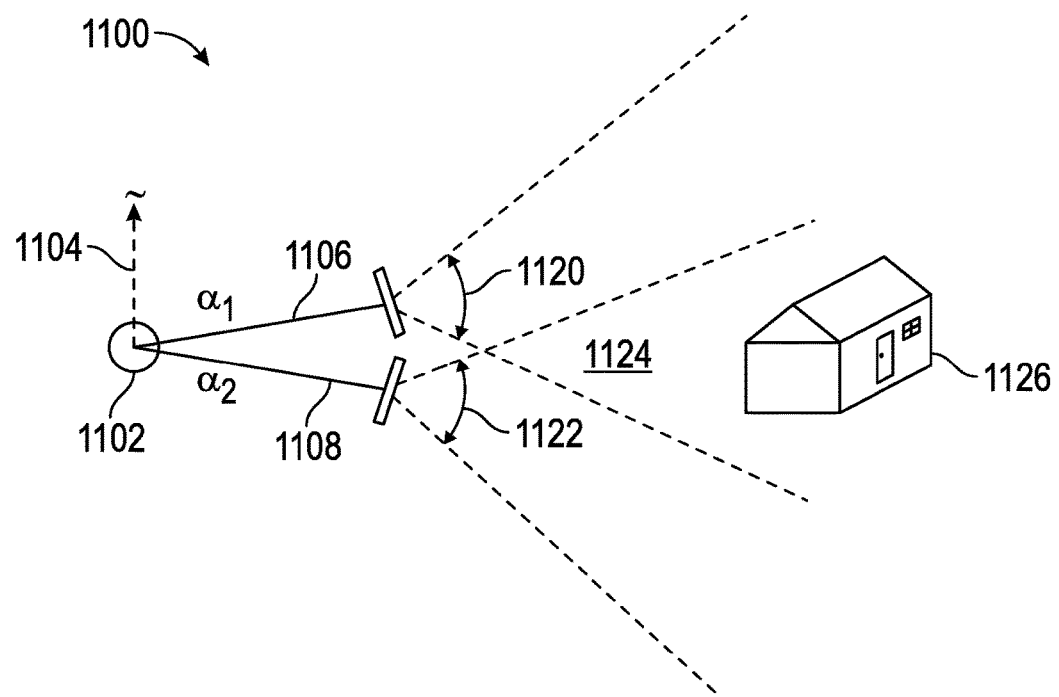
Figure 12:
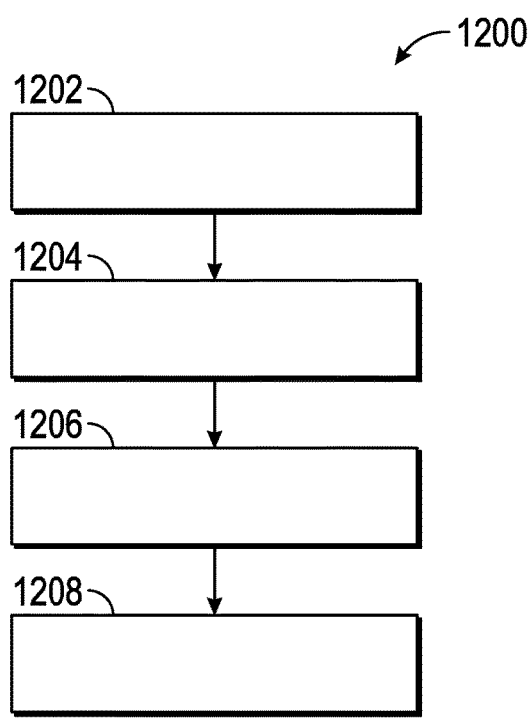
Figure 13:
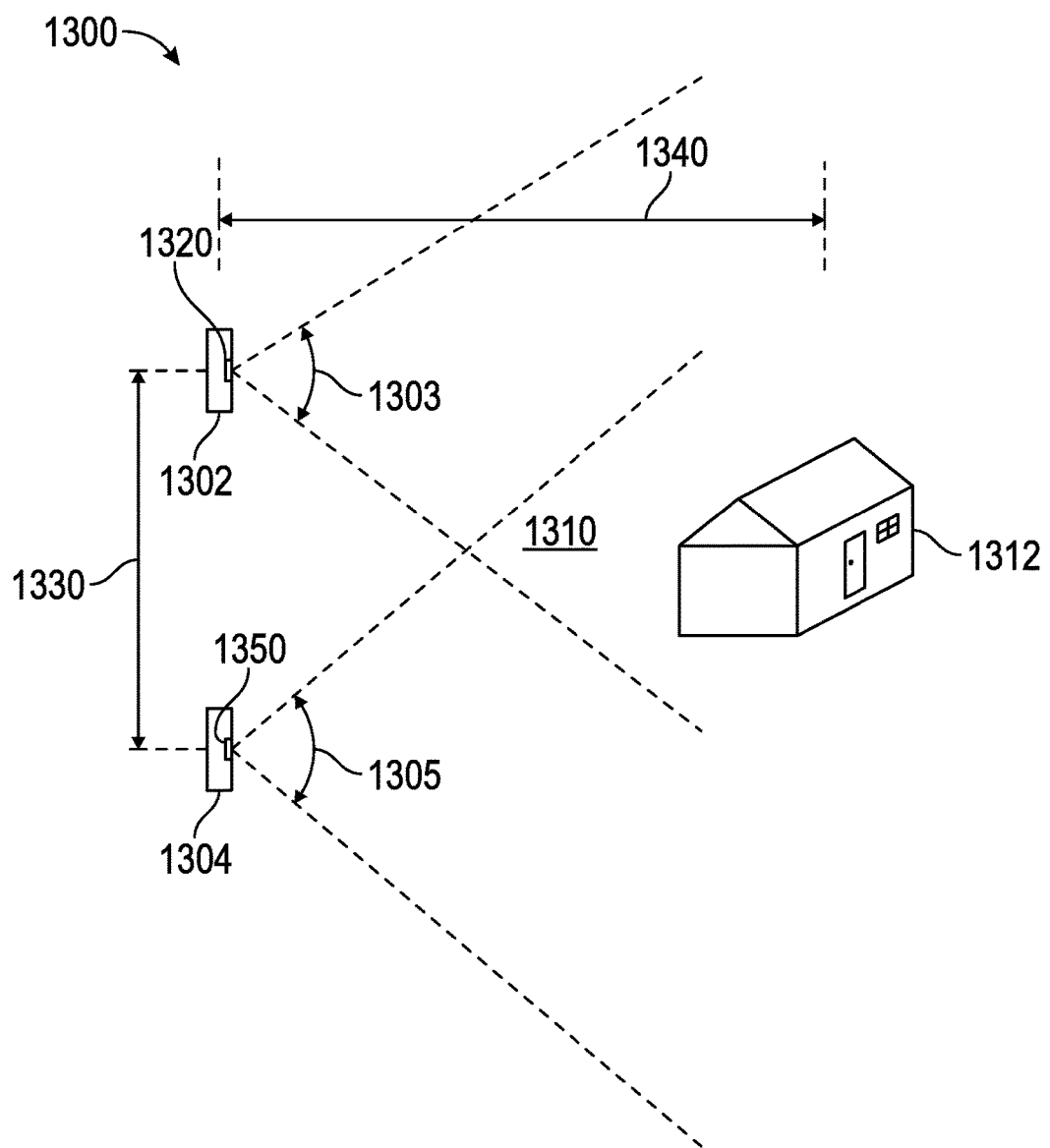
Figure 14:
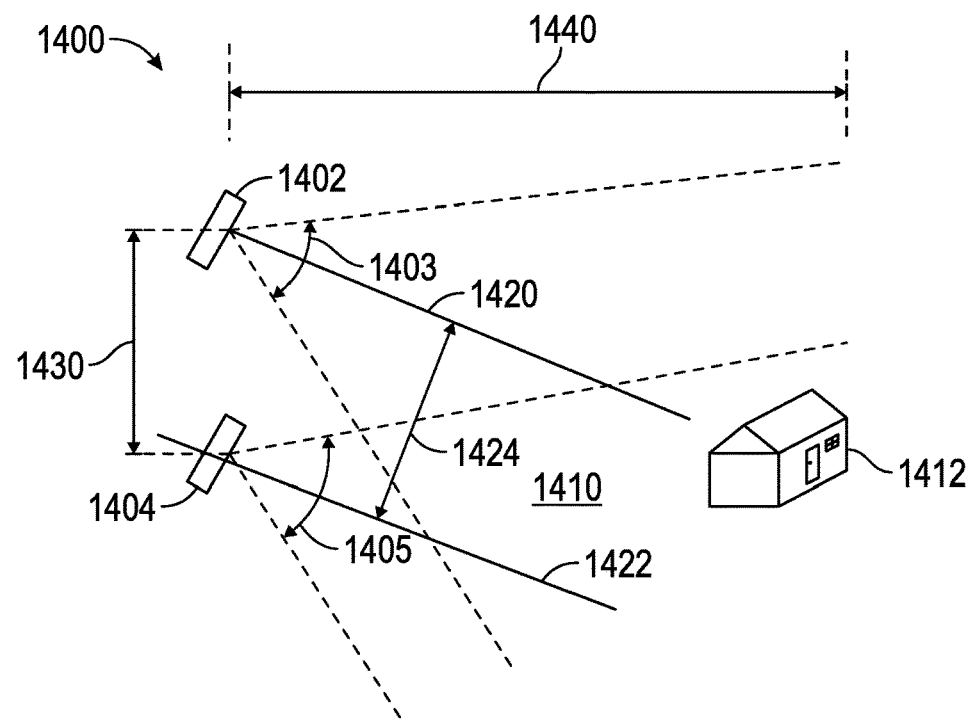
Figure 15:
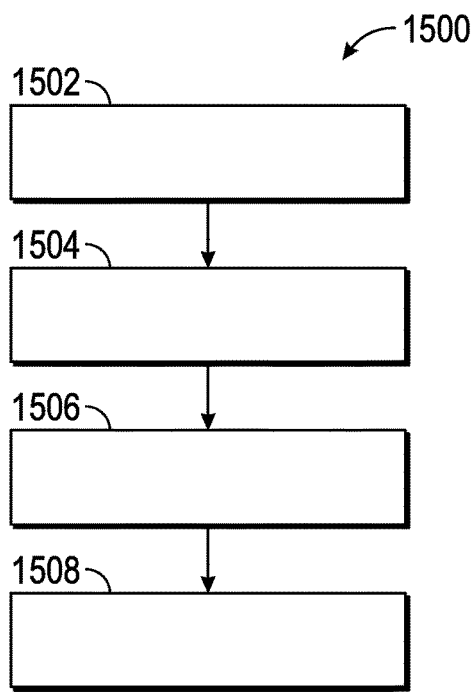
Figure 16A:
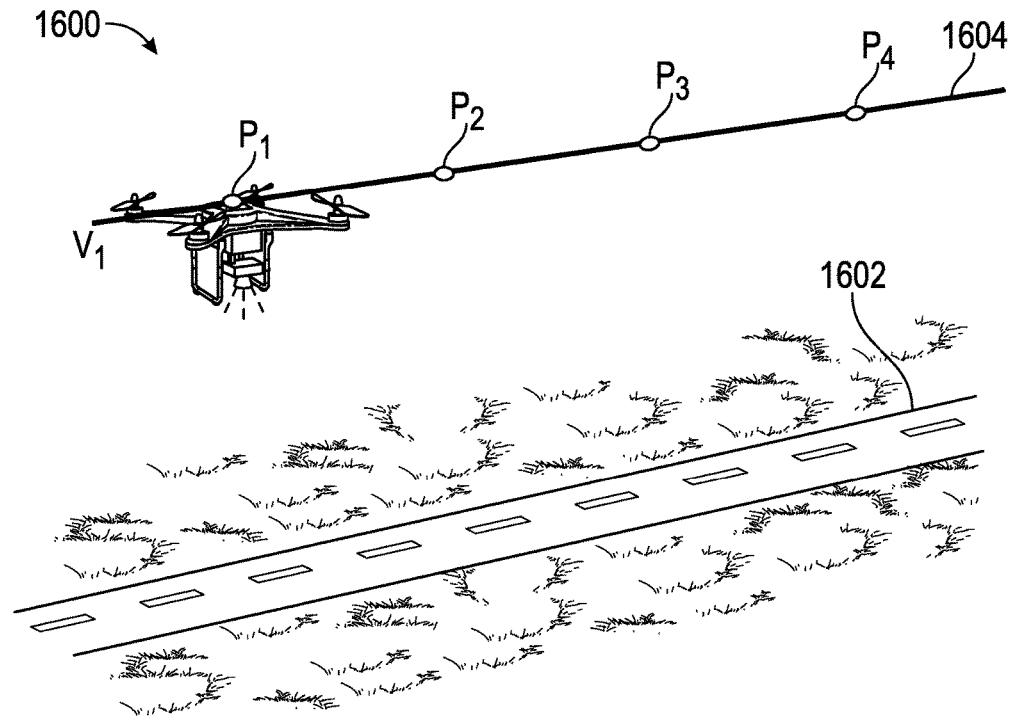
Figure 16B:
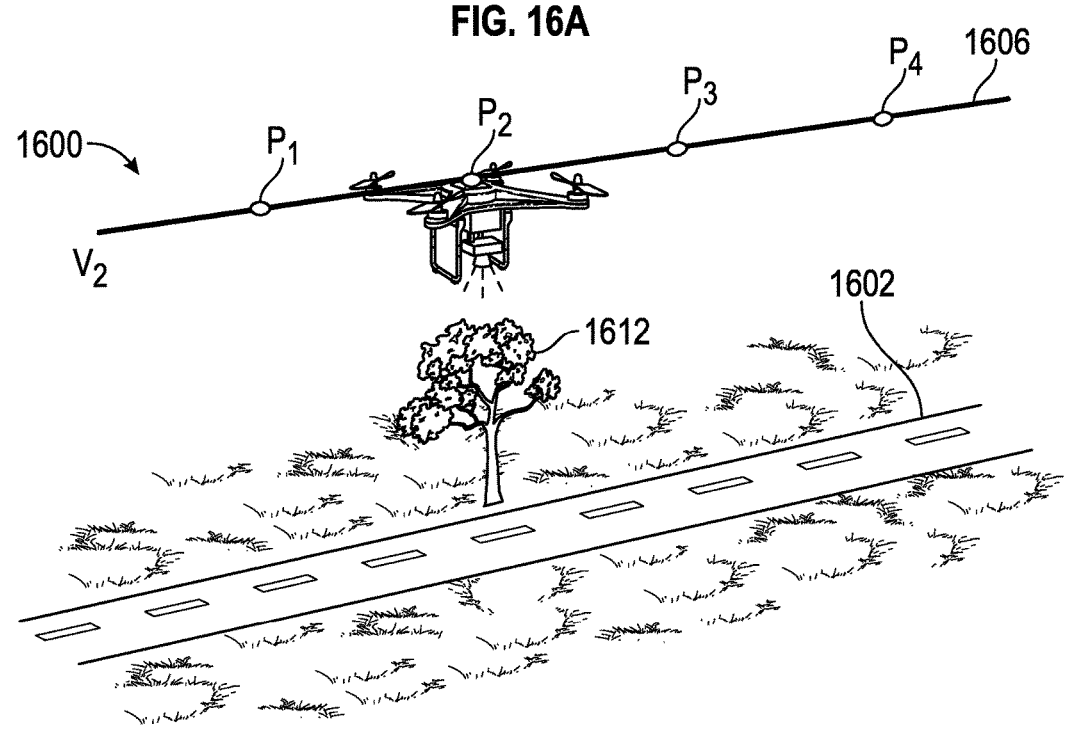
Figure 16C:
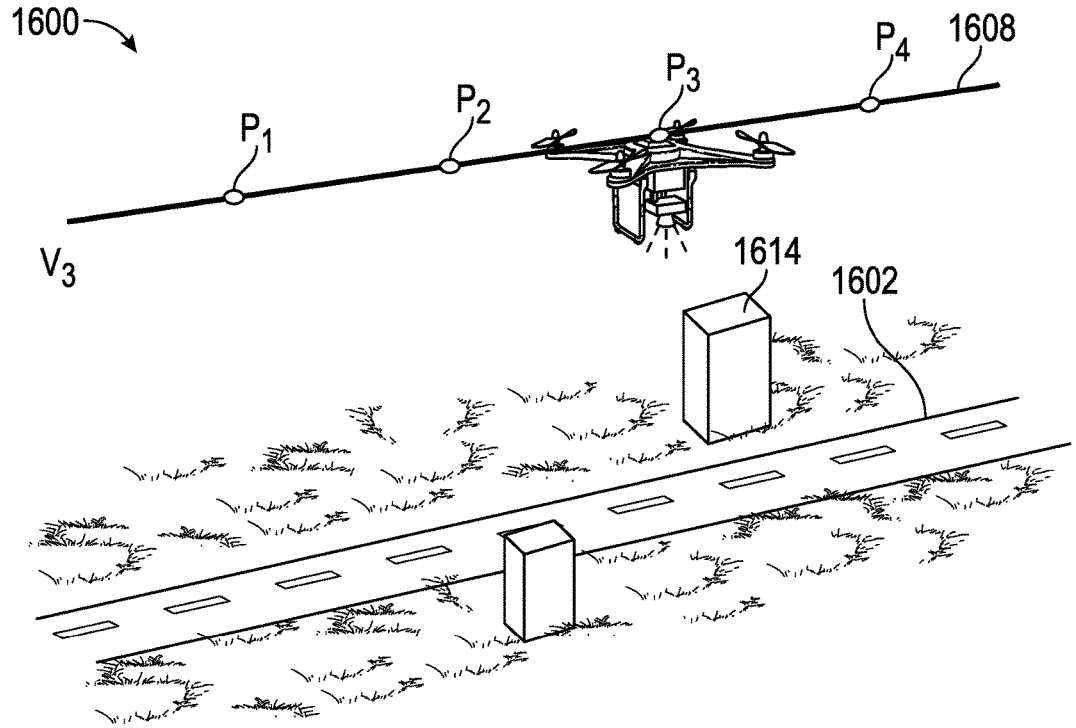
Figure 16D:
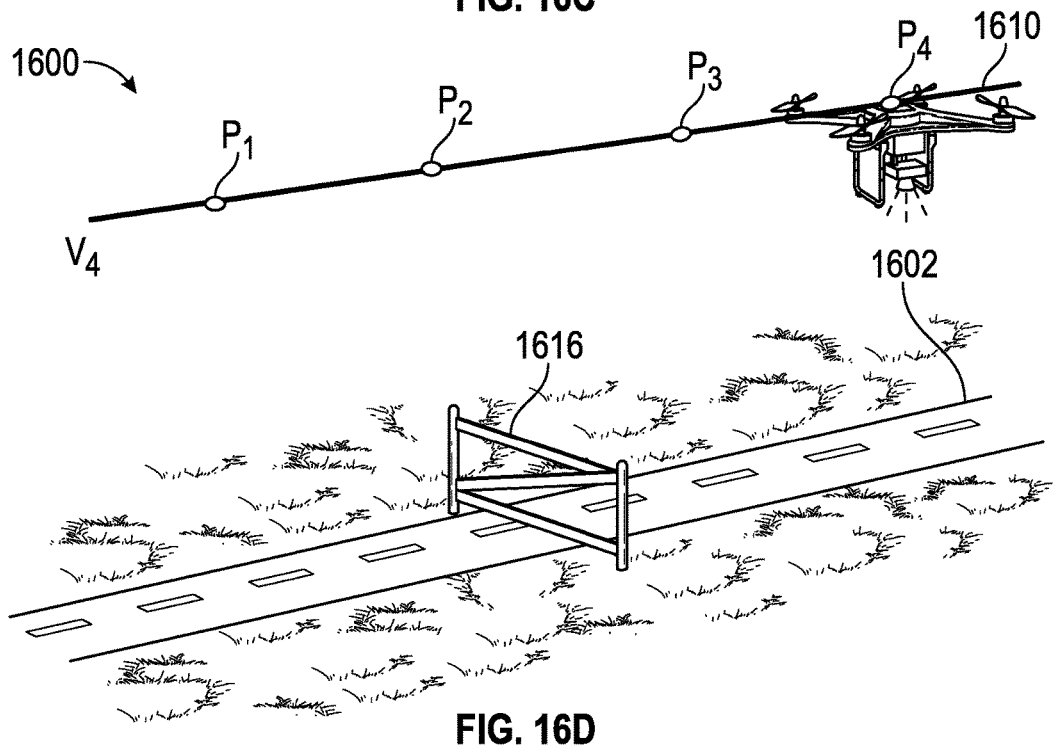
Figure 17:
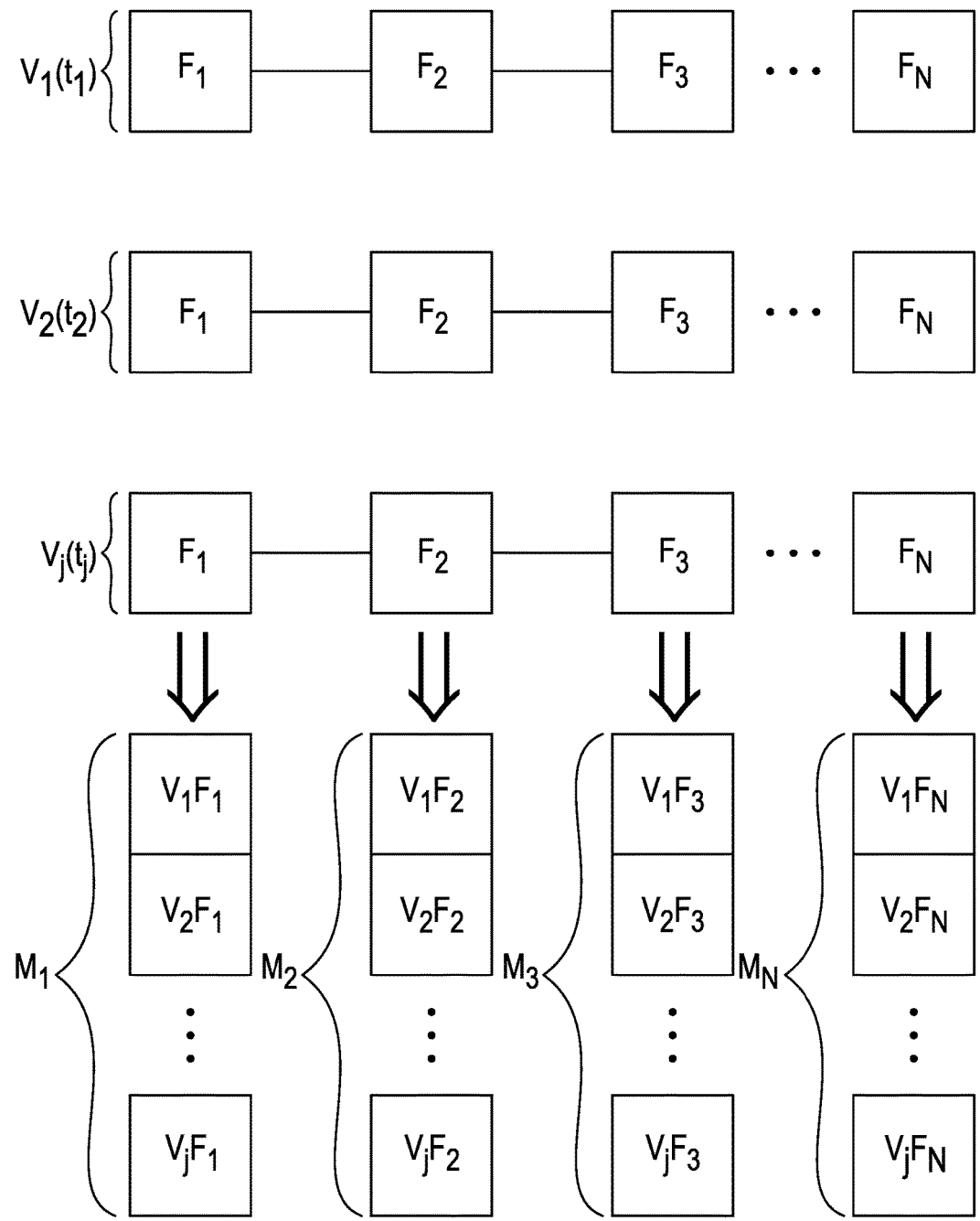
Figure 18:
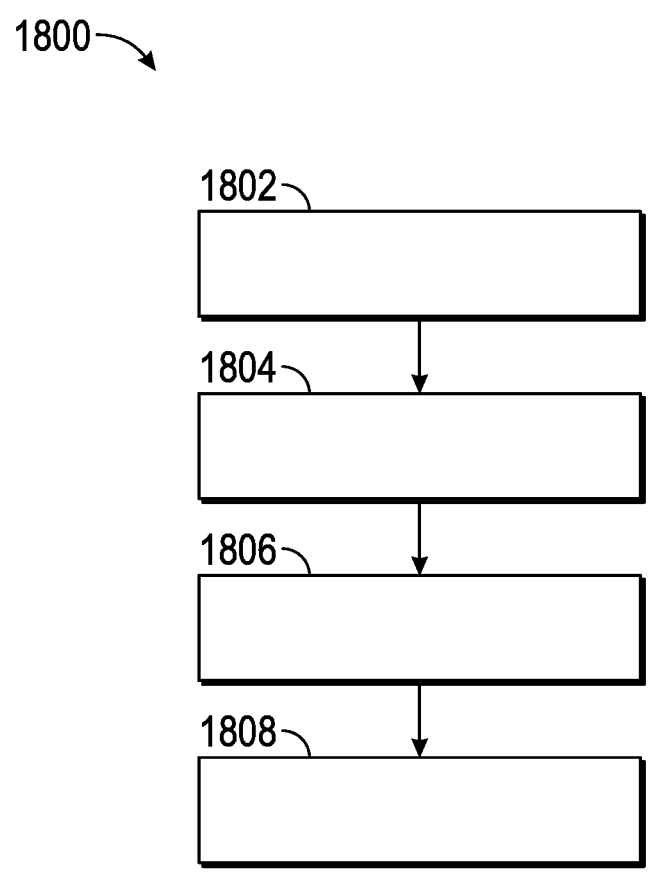

FIG. 4 a schematic block diagram of an exemplary system for embedding/threading AHRS, GPS, and/or PPS metadata into image data in accordance with various embodiments;

FIG. 5 is a flow diagram illustrating an exemplary process for synchronizing multiple camera shutters using a PPS signal in accordance with various embodiments;

FIG. 6 is a schematic diagram of an exemplary depth map useful in constructing stereoscopic images in accordance with various embodiments;

FIG. 7 is a schematic diagram of an exemplary camera system for mapping high resolution image data to a depth map created using a low resolution camera in accordance with various embodiments;

FIG. 8 is a schematic diagram of an exemplary stereoscopic image constructed using the system of FIG. 7 in accordance with various embodiments;

FIG. 9 is a schematic flow diagram illustrating an exemplary method of mapping high resolution image data to a depth map in accordance with various embodiments;

FIG. 10 is a schematic top view of an exemplary camera pivotably mounted about an arm for recording cylindrical panoramic stereo images in accordance with various embodiments;

FIG. 11 is a schematic top view of the camera system of FIG. 10, depicting an object within respective overlapping fields of view of the camera in successive angular positions-in accordance with various embodiments;

FIG. 12 is a flow diagram of an exemplary process for the geo-spatial mapping of objects using metadata embedded in stereoscopic images taken from a single pivoting camera in accordance with various embodiments;

FIG. 13 is a schematic diagram of an exemplary system for recording stereo pairs recorded using independently controlled camera platforms in accordance with various embodiments;

FIG. 14 is an alternate view of the system of FIG. 13, with the lenses tilted downwardly in accordance with various embodiments;

FIG. 15 is a flow diagram of an exemplary process for maintaining a substantially constant ration between an object distance and a stereo base in accordance with various embodiments;

FIGS. 16A-D are schematic diagrams of an exemplary camera platform making multiple passes by and recording a scene changing over time in accordance with various embodiments;

FIG. 17 is a graphical depiction of an exemplary scheme for converting a series of videos into a plurality of time lapse movies in accordance with various embodiments; and FIG. 18 is a flow diagram of an exemplary process for assembling image frames together from successive videos to create a time lapse movie in accordance with various embodiments.

DETAILED DESCRIPTION OF PREFERRED EXEMPLARY EMBODIMENTS

The following detailed description is merely exemplary in nature and is not intended to limit the invention or the application and uses of the invention. Furthermore, there is no intention to be bound by any theory presented in the preceding background or the following detailed description.

Tetherless Shutter Synchronization

A global positioning system (GPS) receiver device reports position data along radial longitudinal and latitudinal rays extending from the mass center of the Earth (an oblate spheroid), and altitude above or below sea level. Each of the various GPS satellites knows its own longitude, latitude, and altitude above sea level, and pings the GPS device. The device measures the message transmission time to determine its position based on the coordinates received from multiple satellites, coupled with the respective transmission times. GPS time is now the world standard time clock, using cesium clocks which express time down to the pico-second.

An inertial measurement unit (IMU) provides relative measurements of attitude (yaw, pitch, and roll); that is, differences in these parameters from a previous measurement. Attitude and Heading Reference Systems (AHRS) systems, on the other hand, provide absolute attitude measurements, typically using a three-axis magnetometer, a three-axis accelerometer, and a three-axis gyroscope. The output of the gyroscope corresponds to the derivative of the output of the accelerometer; the integral of the gyroscope output yields the output of the accelerometer. AHRS systems have recently undergone dramatic cost reductions due to advances in micromachining of piezoelectric and other materials in silicon, enabling applications of micromachined accelerometers and gyroscopes which were heretofore cost prohibitive.

In various embodiments described herein contemplate cameras equipped with a GPS receiver to report the geospatial coordinates of the camera, and an AHRS to report the orientation of the lens axis within the context of the AHRS reference coordinates, namely: facing North (zero yaw), and parallel to the surface Earth (zero pitch and roll). In the context of still photography, video, and/or stereoscopy, the foregoing devices allow image data to be augmented with metadata including pulse-per-second (PPS), GPS coordinates, and AHRS yaw, pitch, and roll information relative to the lens axis for every data frame, as desired.

In this regard, the Bosch™ company produces a single chip which outputs AHRS metadata in combination with a GPS chip which outputs GPS metadata on a first output pin and a PPS "time hack" signal on a second output pin. In this context, PPS time is an independent metric extracted from the GPS chip and derived from the GPS satellites.

In addition, the 65 nm GPS chip available from Texas Instruments™ supports one pulse-per-second 1 PPS) timing, and provides a high precision 1 ms wide pulse whose rising edge is aligned to GPS time (or UTC time) second boundary. The pulse is present on the PPS_OUT pin of TI GPS chips. The 1PPS pulse is 100 ms wide and the leading edge is the on-time mark. The payload data (e.g., National Marine Electronics Association (NMEA) data) output trails the 1PPS by approximately 300 ms.

In accordance with the present invention, multiple camera shutters may be synchronized without the need for a physical tether, by using GPS Pulse Per Second (PPS) signaling. With this technique two or more camera platforms may be closely synchronized with no need for real time communication channels between them, regardless of the distance between them. This also informs the system exactly when (and where) each frame is taken both in an absolute sense, as well as relative to the other frames from the same and other cameras. Many image systems already contain GPS receivers; hence, using this technique allows multiple cameras to be reliably synchronized with little or no additional hardware costs. Using various synchronization techniques described herein, two or more camera platforms may be precisely synchronized by using the PPS pulse to cause each shutter in a multiple camera system to simultaneously record an image.

Various embodiments employ a GPS device of the type which has a pin that separately reports a pulse-per-second (PPS) signal; that is, the PPS signal transitions from low to high at precisely the same instant that the GPS measurements were taken. The PPS pin exhibits a very low rise time (high transition rate); it transitions from low to high in less than a microsecond, perhaps on the order of a picosecond. To synchronize shutters in presently known cameras, we need resolution on the order of ten microseconds. Thus, regardless of the physical separation between two devices, they can be synchronized on the order of picoseconds using the techniques described herein.

Specifically, the present invention uses the PPS transition to cause a picture (or multiple pictures) to be taken at the PPS transition. Alternatively, the PPS signal may be used to cause a picture (or frame) to be recorded at a predetermined amount of time following the PPS transition. In either case, as long as two or more cameras are configured to take a picture (or video frame) at the same point in the PPS cycle, they will necessarily be synchronized because every GPS device which outputs PPS is necessarily self-referenced to the same world clock signal.

Fastest shutter transitions are about ten microseconds; that's how long it takes the chip to collect photons. Mechanical shutters transition using a moving slit (rolling shutter), where the top of the frame is taken at a different time than the bottom of the frame. Synchronizing two cameras to get a stereographic image requires only that the two contributing images be taken at the same time, even if the top of each image is recorded before or after the bottom. Ten microseconds is a conservative lower limit for a frame exposure time.

Presently, cameras use a tethering cable to synchronize shutters (generally referred to as "genlock"), which limits the distance the cameras can be apart from each other to the length of the tethering cable. For multiple cameras genlocked together, there is usually one master and one or more slaves which follow the synchronization signal dictated by the master. In accordance with various embodiments of the invention, PPS metadata may be embedded into every frame, effectively locking together every camera having embedded PPS data, even if the multiple cameras were not knowingly coordinated at the time the images were taken.

The synchronization is particularly important for 3D or stereoscopic photography, where even small synchronization errors can corrupt the resulting stereoscopic image.

Other applications include sporting events (instant replay), security for crime scene reconstruction, battlefields, and the entertainment industry (action sequences). Even with live video, all cameras may be effectively synchronized to the PPS, eliminating unintended digital artifacts when switching from one camera feed to another.

This technique allows the synchronization of any number of cameras and other recording devices/sensors (earthquake vibration), for example thousands of synchronized devices, distributed anywhere in the world, provided they are configured to receive a PPS timing signal from GPS satellites.

For still 3D photography, the respective shutters of the two cameras need to be synchronized. Currently, even when the "shutter" command is simultaneously sent to both cameras, it isn't executed until the local processor arrives at the appropriate point in the processing loop. Most video cameras use a frame rate of 30 frames per second. This is called time rivalry, and manifests as a corrupted 3D image when the shutters are inadequately synchronized (e.g., ten microseconds). So instead of instructing the camera to "take a picture now," the present invention contemplates sending an instruction which effectively says "take a picture on Jan. 3, 2016 at precisely 11:25.47," or "begin recording video precisely upon the occurrence of a PPS rising edge," whereupon all cameras will initiate recording at the rising edge of a specified PPS pulse. Moreover, by internally instructing camera processors to always take pictures on the rising edge of the PPS signal, the images can be retroactively integrated using the embedded time hack metadata.

Figure 1:
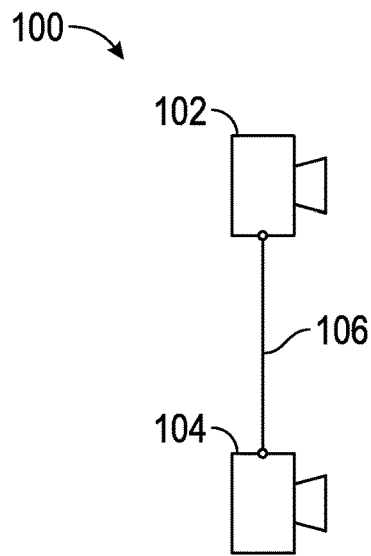
FIG. 1 is a schematic perspective view of an exemplary prior art shutter synchronizing technique using a tether.

Referring now to FIG. 1 an exemplary prior art shutter synchronizing system 100 includes a first camera 102, a second camera 104, and a tether 106 configured to gunlock the two cameras together to thereby synchronize their respective shutters.

Figure 2:
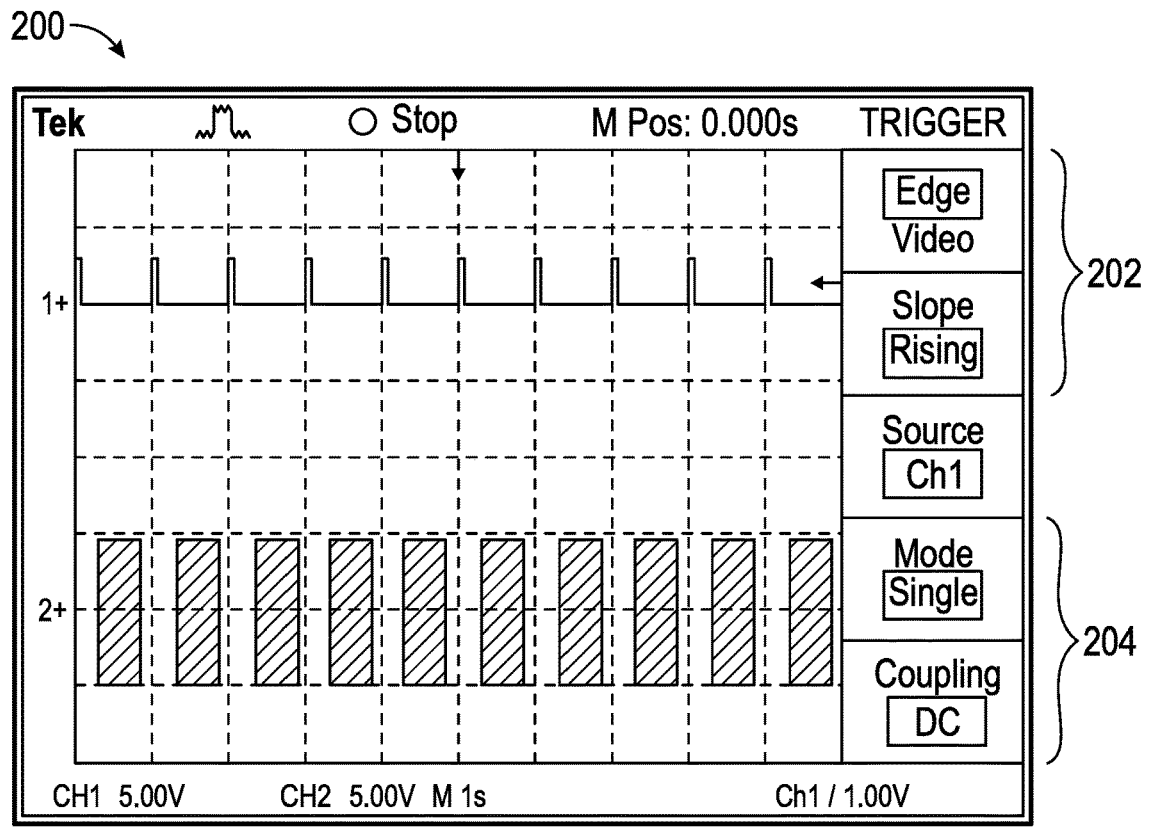
FIG. 2 is an exemplary display graphically depicting the timing relationship between a pulse-per-second (PPS) component and the payload data component of a global positioning (GPS) device output signal in accordance with various embodiments.

FIG. 2 is an exemplary display 200 illustrating a pulse-per-second (PPS) signal component 202 and a payload signal component 204 of a global positioning (GPS) device output signal.

Figure 3:
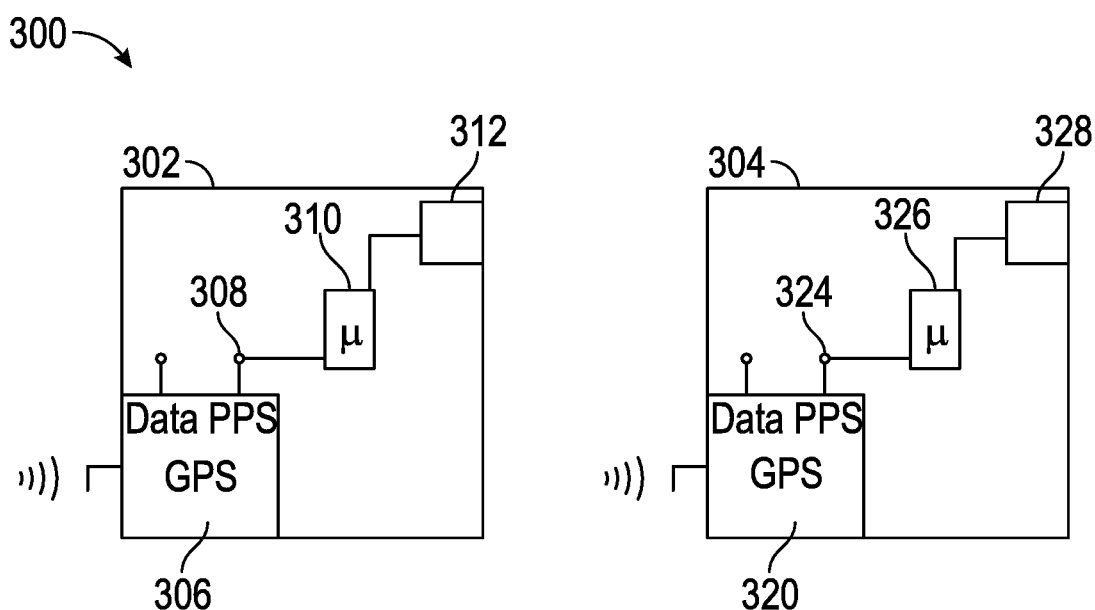
FIG. 3 is a schematic block diagram of an exemplary system for synchronizing multiple camera shutters using a PPS signal in accordance with various embodiments.

FIG. 3 is a schematic block diagram of an exemplary system 300 for synchronizing multiple camera shutters using a PPS signal in accordance with various embodiments. More particularly, the system 300 includes a first camera 302 and a second camera 304, with the shutter execution of both cameras controlled by the same externally received timing signal. The first camera 302 includes a first GPS receiver 306 having a PPS output pin 308, a microprocessor 310, and a shutter controller 312. The second camera 304 includes a second GPS receiver 320 having a PPS output pin 324, a microprocessor 326, and a shutter controller 328.by configuring the respective processors 310, 326 to execute a "record" instruction based on a particular PPS pulse, the shutters may be precisely controlled without the need for a physical tether extending between the two (or more) cameras.

FIG. 4 a schematic block diagram of an exemplary system 400 for embedding/threading AHRS, GPS, PPS, and/or other metadata into image data in accordance with various embodiments. In particular, the system 400 includes a processor (for example a camera microprocessor) 402 configured to receive multiple inputs, and to output a resulting signal 412. In the illustrated embodiment, a first input 404 comprises image data (e.g., a recorded image or data frame), a second input 406 comprises AHRS information, a third input 408 comprises GPS coordinate information, and a fourth input 410 comprises timing information (e.g., a PPS signal component). The resulting output signal 412 may comprise a composite data frame including an image data component 414 a metadata component 416.

FIG. 5 is a flow diagram illustrating an exemplary process 500 for synchronizing multiple camera shutters using a common timing signal. In particular, the process 500 includes receiving a timing signal at a first camera (Task 502), receiving the same timing signal at a second camera (Task 504), and simultaneously recording first and second data frames by the first and second cameras, respectively (Task 506). Metadata including information relating to the timing signal, position information, and/or attitude (e.g., AHRS) information may then be embedded into the first and/or second data frames (Task 508).

A camera is thus provided which includes: a lens; a recording plane; a shutter configured to selectively pass photons from the lens to the recording plane; a timing module configured to receive a periodic timing pulse from an external source; and a processor configured to actuate the shutter in response to the timing pulse.

A camera is thus provided which includes: a lens; a recording plane; a shutter configured to selectively pass photons from the lens to the recording plane; a timing module configured to receive a periodic timing pulse from an external source; and a processor configured to actuate the shutter in response to the timing pulse.

In an embodiment, the timing module comprises a global positioning system (GPS) chip including a pulse per second (PPS) pin at which the periodic timing pulse appears.

In an embodiment, the external source comprises a plurality of GPS satellites.

In an embodiment, the processor is configured to actuate the shutter responsive to a rising edge of the timing pulse.

In an embodiment, the recording plane comprises a photosensitive medium which may include film and/or an array of digital pixels.

In an embodiment, the processor is configured to: execute a sequence of instructions including a shutter actuation instruction; and execute the shutter actuation instruction immediately upon detecting the timing pulse.

In an embodiment, the recording plane is configured to capture a still photographic image and/or a series of video frames.

In an embodiment, the periodic timing pulse comprises a regular repeating series of timing signals each having a duration in the range of 100 milliseconds.

In an embodiment, each timing signal comprises a rising edge having a duration in the range of one nanosecond to one picosecond.

In an embodiment, the GPS chip further comprises a data pin configured to present GPS coordinate data in the range of 100 to 500 milliseconds following each periodic timing pulse.

A method is also provided for controlling the actuation of a camera shutter. The method includes: equipping the camera with a timing module configured to receive a periodic timing signal from a source external to the camera; detecting a leading edge of a unique pulse of the timing signal; and in response to detecting the leading edge, actuating the shutter.

In an embodiment, the timing module comprises a global positioning signal (GPS) receiver including a timing output pin; and the periodic timing signal comprises a pulse-per-second (PPS) signal presented at the timing output pin.

In an embodiment, actuating the shutter comprises exposing a photosensitive medium.

In an embodiment, the duration of each timing pulse is in the range of 100 milliseconds; and the duration of the leading edge is in the range of one nanosecond to one picosecond.

A method is also provided for synchronizing the operation of a first shutter of a first camera with the operation of a second shutter of a second camera without a physical tether between the first and second cameras. The method includes: receiving a global positioning system (GPS) pulse-per-second (PPS) signal at the first and second cameras; and in response to a unique timing pulse in the PPS signal, simultaneously actuating the first and second shutters.

In an embodiment, the method further includes: prior to the receipt of the unique timing pulse, receiving, at the first and second cameras, an instruction to actuate a respective shutter when the unique timing pulse is subsequently received.

In an embodiment, simultaneously actuating comprises executing respective actuation instructions at both cameras in response to detecting the rising edge of the unique timing pulse.

High/low Resolution Stereo Pair

Binocular vision, namely, two eyes with overlapping fields of view, facilitates stereoscopic vision and the ability to perceive and measure depth and distance. Eyes located at different lateral positions on the head results in two slightly different images projected to the retinas of the eyes. These positional differences produce horizontal disparities which are processed in the visual cortex of the brain to yield depth perception and the mental rendering of three dimensional structures within a three dimensional spatial experience. Human stereo vision fuses the left and right views (channels) of a scene into a single "cyclopean" view in the brain;

that is, the world appears to be seen from a virtual eye midway between the left and right eye positions.

Analogously, stereoscopic photography (whether still or cine) employs two cameras with their respective axes separated by a distance referred to as the stereo base or inter-axial separation. Stereoscopy manifests the illusion of depth in a still image, video, or other two-dimensional display by the presentation of a slightly different image to each eye, whereupon the two images are combined in the brain to yield the perception of depth.

A "stereo pair" refers to right and left images used to construct a resulting 3D image. In a typical stereoscopic recording system, the respective axes of a left and a right camera lens are offset by a predetermined distance (the stereo base), which may be static or variable. When constructing a 3D image from the left and right channel data, a depth map (also referred to as a disparity map) may be constructed to map the scene depth range onto a plurality of regions which together make up the available perceived (displayed) depth range. (See, Nick Holliman "Mapping Perceived Depth to Regions of Interest in Stereoscopic Images", available at http://www.comp.leeds.ac.uk/edemand/publications/holo4a.pdf, the entire contents of which is hereby incorporated herein by this reference).

Presently known systems and techniques acquire both channels (left and right) of 3D image data at the same resolution. (See, Patrik Kamencay et al. "Improved Depth Map Estimation from Stereo Images Based on Hybrid Method," available at http://www.radioeng.cz/fulltexts/2012/12_01_0070_0078.pdf; and Guidi et al., "Resolution Characterization of 3D Cameras," SPIE-IST&T Vol. 7239, available at http://www.academia.edu/416412/Guidi G. Russo M. Magrassi G. Bordegoni M. 2009 Resolution Characterization of 3D cameras, the entire contents of which are hereby incorporated herein by these references).

The present inventor proposes using low resolution imagery for one half of a stereo pair (e.g., the left channel), and high resolution imagery for the other half (e.g., the right channel). The wide field coverage of a scene in low resolution provides the depth, size, and/or positioning information (3D) for objects to be resolved using high resolution images captured with a narrow field camera. Once the 3D model of the scene is made, pixel data from the high resolution channel may be mapped onto the low resolution channel data using the 3D model, resulting in a high resolution stereo pair of the object imaged for visualization. It will be appreciated, however, that even without this mapping the human brain may actually "see" the cyclopean image in high resolution when the mixed resolution channels are presented visually.

FIG. 6 is a schematic diagram of an exemplary scene 600 useful in constructing stereoscopic images. In accordance with an embodiment, the scene 600 was recorded using a low resolution lens alone or in combination with a high resolution lens. By creating a depth map of the scene, the high resolution image data may thereafter be specifically mapped to particular depth zones to yield a resulting 3D image.

More particularly and with continued reference to FIG. 6, the scene includes a first object 602 (a tree), a second object 604 (a mountain), and a third object 606 (a jet airplane). Those skilled in the art will appreciate that a depth map may be created by subjectively (e.g., manually), algorithmically, or otherwise assigning the objects within the scene to two or more depth zones. In the illustrated example, the first object 602 is assigned to zone 1 closest to the viewer, the second object 604 is assigned to an intermediate depth zone 2, and the third object is assigned to a far distant zone 3. The resulting depth map and corresponding zones may then be used to map the high resolution pixel data associated with the various objects into their corresponding zones.

With continued reference to FIG. 7, the image data captured by the first camera 702 may be referred to as the left side data or first channel data, and the image data captured by the second camera 712 may be referred to as the right side data or second channel data. The overlap between the wide field of view 706 and the narrow field of view 716 may be divided into a plurality of regions corresponding to successive distances from the camera assembly, including a first (near field) region 732, a second (intermediate field) region 734, and a third (far field) region 736. Those skilled in the art will appreciate that any number of regions corresponding to any number of depth regions may be contemplated.

In the embodiment illustrated in FIG. 7, a first object 722 (e.g., a tree) resides within the first region 732, a second object (e.g., a person) 724 resides within the second region 734, and a third object (e.g., a building) 726 resides in the third region 736. Mature and robust techniques have been developed for mapping various elements in a scene to appropriate perceived depth ranges or regions for 3D viewing including. (See, for example, http://3dstereophoto.blogspot.com/p/software.html; http://3dstereophoto.blogspot.com/2014/02/depth-map-automatic-generator-4-dmag4.html; http://www.gimpel3d/com/; http://www.3dphoto.net/forum/index.php?topic=8877.0; and http://www.i-art3d.com/Eng/About Depth.htm, the entire contents of which are hereby incorporated herein by these references).

Referring now to FIG. 8, depth mapping techniques may be employed to create a 3D image 800 in which a first element 822 appears within a first (near field) region, a second element 824 appears within a second (intermediate field) region, and a third element 826 appears within a third (far field) region in the context of a 3D display which integrates the first channel data from the first camera 702 and the second channel data from the second camera 712.

Once the depth map for the integrated scene is created or, alternatively, once the various elements of the scene are positioned or arranged for viewing based on the low resolution image data captured by the first camera 702, the high resolution image data for these objects captured with the narrow field camera 712 may be mapped onto these positions. Specifically, pixel data from the high resolution channel may be overlaid onto the low resolution side using the 3D model, resulting in a high resolution stereo pair of the object imaged for visualization.

FIG. 9 is a schematic flow diagram illustrating an exemplary method 900 of mapping high resolution image data to a depth map. In particular, the method 900 includes recording a stereoscopic image using a high resolution lens and a low resolution lens (Task 902), and assigning objects in the scene to distance levels (depths) (Task 904). The high resolution data associated with each object may then be mapped to the corresponding depth zones identified in TASK 904 (Task 906). The resulting three-dimensional image may then be displayed (Task 908).

In an embodiment, a low cost stereoscopic camera system can be constructed using an inexpensive low resolution, small lens, wide-field camera for capturing depth and/or positioning information (3D), combined with a comparatively more expensive large lens camera, such as a digital single lens reflex (DSLR) or full cinemagraphic camera, making the resulting stereo camera much less expensive than one constructed of two high end cameras.

Specifically, instead of using two DSLRs to make a stereo camera, the present invention contemplates using one DSLR and one low cost (e.g., mobile phone type quality) camera to record the stereo pair. The high cost DSLR camera is used to record the high resolution image, and the low cost camera is used to obtain the depth information. That is, the high resolution camera determines the resulting image quality, whereas the low resolution camera determines the depth map (because determining depth does not require hi resolution).

A three-dimensional (3-D) camera system is thus provided which includes: a first camera having a first lens axis, a first field of view, and a first resolution; a second camera having a second lens axis substantially parallel to the first lens axis, a second field of view, and a second resolution; and a stereo base separating the first and second lens axes; wherein the second resolution is substantially higher than the first resolution.

In an embodiment, the first and second cameras are configured to record still images and/or video frames.

In an embodiment, the camera system further includes a processor configured to receive first channel image data from the first camera, and first channel image data from the first camera, and to combine the first and second channel data into a composite 3D image.

In an embodiment, the processor is configured to construct a depth map using the first channel data, and to map the second channel data onto the depth map.

In an embodiment, the processor is configured to arrange objects for three dimensional viewing based the first channel data, and to overlay pixel information based on the second channel data onto the arranged objects.

In an embodiment, the processor is configured to overlay high resolution pixel information from the second camera onto objects arranged for viewing based on low resolution information from the first camera.

In an embodiment, the first and second cameras are each configured to receive a pulse-per-second (PPS) signal from an external source; and the processor is configured to synchronize the acquisition of the first and second channel image data based on the PPS signal.

In an embodiment, the first and second cameras are each configured to receive global positioning system (GPS) data from an external source; and the processor is configured to embed the GPS data into the composite 3D image.

A method of constructing a three-dimensional image is also provided, comprising: receiving, by a processor, a first signal from a first camera having a first field of view, the first signal characterized by a first resolution; receiving, by the processor, a second signal from a second camera having a second field of view substantially narrower than the first field of view, the second signal characterized by a second resolution substantially greater than the first resolution; and combining the first and second signals into a three-dimensional image.

In an embodiment, the method further includes: constructing a depth map using the first signal; and mapping pixels derived the second signal onto the depth map.

In an embodiment, the method further includes: identifying objects from the first signal; arranging the objects for three-dimensional viewing; and overlaying high resolution data from the second signal onto the arranged objects.

In an embodiment, arranging the objects comprises mapping a scene depth range onto a display depth range.

In an embodiment, the method further includes at least one of: maintaining a fixed distance between a first lens axis associated with the first camera and a second lens axis associated with the second camera; and controllably varying the distance between the first and second axes.

A stereographic camera system is also provided, comprising: a first camera characterized by a first resolution and configured to output a first signal; a second camera characterized by a second resolution substantially higher than the first resolution and configured to output a second signal; and a processor configured to: construct a depth map of objects using the first signal; and map pixel data derived from the second signal onto the objects.

Stereoscopic Cylindrical Panorama

Making stereo pairs for use in constructing a 3D visualization by pivoting a single camera is known. In one aspect of the invention, GPS coordinates and other system parameters are used to derive size and position information for objects in the 3D image. In particular, by recording/embedding metadata into the image data recorded by two "cameras" (or the same camera at two closely spaced angular positions), various size, distance, and other information may be extracted from the images. This works particularly well for stationary objects, and may also be used for moving objects within the image. The stereoscopic images provide two benefits: i) the subjective effects of 3D vision; and ii) the objective measurements useful for object mapping.

Presently known stereo photography systems typically use two cameras with parallel axes that shutter simultaneously; or use the same camera and shift it horizontally to define a stereo base distance. As explained in greater detail below, capturing image data in this way allows the and position of objects to derived from the image data.

Using true stereo base (65-70 mm) and focal length (50 cm diagonal) values approximates ortho-stereo conditions, creating a realistic reproduction. If the stereo base and the focal length are both doubled, ortho-stereo conditions no longer obtain, but the resulting stereo images still retain a realistic effect. Thus, as the objects being measured are further away from the camera, maintaining the stereo base proportional to the focal length helps to maintain the measurement accuracy of objects in the scene.

Various embodiments simplify the data capture phase associated with measuring the size and geo-position of objects in the field, by relaxing the need for two cameras and recording stereo pairs by incrementally advancing a single camera about an arc. This allows the location, position, and size for all stationary objects within the entire 360 rotational field of view to be accurately mapped. Starting with the known GPS coordinates of the camera, data from the stereo analysis yields the position and size information for objects in the scene.

By way of brief background, during WWII planes mounted with a camera took nadir images of artillery located on the ground, and used successive images to create stereo pairs. The stereo pair would later be viewed through special lenses to construct a 3D image and, using known altitude and complex optical and geometric analyses, the object size could be inferred. For example, determining the wing span of a plane parked on a runway could reveal the type of plane. The present invention extends this application by using stereo pairs, coupled with the camera GPS coordinates and angular position information, to determine the distance between the camera and the object and, hence, the object position.

Techniques for creating stereo panoramas using a single camera are described in Shmuel Peleg et al., "*Stereo Panorama With a Single Camera*," Institute of Computer Science at The Hebrew University of Jerusalem, available at http://www.cs.huji.ac.il/~peleg/papers/cvpr99-stereopan.b-pdf, the entire contents of which are hereby incorporated herein by this reference. The present invention extends the single camera technique using GPS coordinates to derive size and position information for the objects in the stereo image.

The present invention combines the known GPS coordinates for and angular position of the camera with metadata for the objects being mapped to determine their size and location. Specifically, from two adjacent angular positions of the camera and the length of the camera arm, a stereo base may be derived and software used to reconcile the difference between the actual positions of the camera (which are not parallel) and the traditional horizontally shifted positions typically used in stereo photography. The stereo image is used to determine the distance at which the object is located from the camera, and the camera GPS coordinates are projected out to the object to determine the object GPS coordinates. The object(s) may then be placed on a geospatial map.

Various techniques have been developed for determining the spatial dimensions of objects represented in image data, and for determining the distance of the objects from the camera that recorded the image data. See, for example, Wang et al., "*Study on Clear Stereo Image Pair Acquisition Method for Small Objects With Big Vertical Size in SLM Vision System*," available at https://www.nebi.nlm.nih.gov/pubmed/26970109; "*Photogrammetry*" available at http://tx.technion.ac.il/~dalyot/docs/Intro-Photogrammetry.pdf; Matt Vitelli and Saumitro Dasgupta, "*Deep Stereo Dense Depth Estimation from Stereo Image Pairs Using Convolutional Neural Networks*," available at http://es23.1n.stanford.edu/reports/saumitro-mvitelli-final-report.pdf; "Computer Vision System Toolbox" available at https://www.mathworks.com/products/computer-vision/features.html?requested.Domain=www.mathworks.com; "*Stereoscopy & Height Measurement*," available at http://www.geog.ucsb.edu./~jeff/115a/lectures/stereoscopy and h eight measurement.html; and Edwin Tjandranegara, "*Distance Estimation Algorithm for Stereo Pair Images*," ECE Technical Reports. Paper 64. http://docs.lib.purdue.edu/ecetr/64, available at http://docs.lib.purdue.edu/cgi/viewcontent.cgi?article=1064&cont ext=ecetr&sei-redir=1&referer=http%3A%2Fwww.bing.com%2Fsearch%3Fq, %3Ddetermining%2520object%2520dimensions%2520 from%2520stereo%2520pairs%26qs%3Dn%26form%3DQBRE%26pq%3Ddete rmining%2520object%2520dimensions%2520from%2520stereo%2520pairs%26sc%3Do-47%26sp%3D-1%26sk%3DFBC0E024C4194C19897E73F6828A1407#seach=%22determining%20object%20dimensions%20from%20stereo%20pairs%22; the entire contents of the foregoing are hereby incorporated herein by these references.

In this regard, the focal length of a lens is classically defined as the distance from the optical center of the lens to the camera sensor (or film plane) when the lens is focused on an object at infinity. The angle of view is the angle of subject area that is projected onto the camera's sensor by the lens. The field of view is another way of representing the angle of view, but expressed as a measurement of the subject area, rather than an angle. The horizontal field of view is related to the focal length by the equation: $FOV_H = 2 \, \text{atan}(0.5 \, \text{width/focal length})$, the vertical field of view is related to the focal length by the equation: $FOV_v = 2 \, \text{atan}(0.5 \, \text{height/focal length})$, where the width and height correspond to the width and height of the sensor (projection plane).

In one embodiment, a GPS enabled camera extended from an arm may be pivoted about a gimbal or spindle, and the image data used to map the location and size of all the objects in the cylindrical image. Presently known software techniques may be used to evaluate the image data and determine the size of the objects and their distance from the camera. Then, using the GPS coordinates of the camera and its angular position, the objects may be placed in their correct positions on a geospatial map.

Referring now to FIG. 10, a angular stereoscopic camera system 1000 includes a camera 1002 configured to pivot 1012 about a spindle 1004, with a connecting arm 1003 defining a stereo base distance 1006 between the camera 1002 and the spindle 1003. An object 1008 within the scene to be recorded is disposed at a distance 1010 from the camera 1002.

FIG. 11 depicts a camera in a first angular position 1106 at a first angle $\alpha_1$ with respect to magnetic north (or other reference) 1104, and in a second angular position 1108 at a second angle $\alpha_2$ with respect to magnetic north 1104. The arm length (the distance between the camera and the spindle) and the delta angle can be resolved into an effective stereo base. In an embodiment, the GPS coordinates of the spindle 1102 and/or the camera are embedded into the data frames of the images recorded by the camera. The camera records a first image corresponding to a first field of view 1120 in the first position 1106, and records a second image corresponding to a second field of view 1122 in the second position 1108. Those skilled in the art will appreciate that a 3D image of an object 1126 may be constructed from the first and second images, and the size and position may be derived for the object from the foregoing information. Once the spatial coordinates of the object are known, the object may be placed onto a spatial map.

A single video camera may thus be mounted on an arm and made to pivot around a center point, with the camera pointing away from the center of rotation. The resulting stereo pairs from adjacent images may be used to map objects visible in a stereoscopic cylindrical panorama created using the video recording captured with this system. Not only can all the objects in the scene be positioned geo-spatially on a map using this data, but the size of any of the objects may also be measured from the imagery.

In one embodiment, recorded metadata includes the geographic location (GPS coordinates) of the center of rotation (or the camera), the distance the camera is from the center of rotation (the arm length), the angle of the rotation from true North as a function of time (or as a function of a video frame sequence), and the field of view of the images recorded. The rotation may be driven manually or automatically, and with a constant or variable rotational speed as long as the angle is known as a function of time or other reference.

Alternatively, a synchronous motor may drive the rotation, simplifying the metadata collection. The accuracy to which the location of objects in the scene may be determined depends on how far they are from the center of rotation, and the radius at which the camera is mounted from the center of rotation. Longer "camera arms" are required to accurately position or size objects that are further away. The FOV of the camera, which is a function of the lens focal length, also has an effect on dimensional accuracy, with longer lenses providing greater accuracy.

In various embodiments, the position and size information for objects in the scene may be determined in real time. Alternatively, they data may be analyzed "after the fact" by using image frames that are further apart in rotation (greater angular differentials) to make multiple cylindrical stereoscopic panoramas, the difference among panoramas being the effective inter-axial lens distance of each image pair. Remarkably, this distance may be "chosen" in post processing, so one pan capture can be used for both visualization and for making accurate positional measurements over a wide range of distances. Given the source recording, real time software can be used interactively to simultaneously visualize, locate, and measure objects in the recorded scene in the context of a Geographic Information System or "virtual world".

In an alternative embodiment, rather than mounting a camera on a physical camera arm, a drone could be programmed to fly a circular path of a given radius around a center point with it's camera pointing out so that the visual data collected could be similarly exploited.

In a further alternative embodiment, the spindle may be replaced with a gimbal, allowing the camera to orbit in multiple planes, thereby facilitating the mapping of objects within a spherical or semispherical (as opposed to a cylindrical) panoramic scene.

FIG. 12 is a flow diagram of an exemplary process 1200 for the geo-spatial mapping of objects using metadata embedded in stereoscopic images taken from a single pivoting camera. In particular, the method 1200 includes gathering left and right images at incremental angular positions and rendering a composite stereoscopic image (Task 1202). The object size(s) may be determined from the stereoscopic image (Task 1204), and the object position(s) may be determined from the camera position and the camera arm length (Task 1206). The object position and size information may then be mapped to the panorama (Task 1208).

A system is thus provided for determining a spatial attribute and a geographic location of an object visible in a cylindrical panoramic scene, comprising: a spindle having a spindle geographic location; a camera having a field of view (FOV) and configured to rotate at a fixed distance about the spindle; and a processor configured to: receive, from the camera, first image data corresponding to a first angular camera position and second image data corresponding to a second angular camera position; derive stereoscopic image data from the first and second image data; determine, using the stereoscopic image data, a spatial attribute of the object; determine, using the spindle geographic location, the fixed distance, and the FOV, an object geographic location; and map the spatial attribute to the cylindrical panoramic scene at the object geographic location.

In an embodiment, the spindle geographic location comprises first global positioning system (GPS) coordinates, and the object geographic location comprises second GPS coordinates.

In an embodiment, the system further includes a camera arm connecting the camera to the spindle and defining the fixed distance.

In an embodiment, the camera includes a lens characterized by a focal length, and further wherein the FOV is a function of the focal length.

In an embodiment, the processor is further configured to: receive, from the camera, a plurality of image data frames corresponding to a plurality of angular camera positions, respectively; derive additional stereoscopic image data from the plurality of image data frames; determine additional spatial attributes for a plurality of additional objects, respectively, using the additional stereoscopic image data; and determine additional object geographic locations for the plurality of additional objects, respectively; and map the additional spatial attributes to the cylindrical panoramic scene at the additional object geographic locations, respectively.

In an embodiment, the objects are stationary when the plurality of image data frames are received.

In an embodiment, the system further includes an encoder configured to sense the angular position of the camera and provide a corresponding angular position signal to the processor.

In an embodiment, at least one of the camera and the spindle comprises a GPS receiver configured to supply a GPS signal to the processor.

In an embodiment, the GPS receiver comprises a pulse-per-second (PPS) receiving pin, and further wherein the GPS signal comprises a PPS component.

In an embodiment, the spatial attribute comprises the height of the object.

In an embodiment, the spatial attribute comprises an object dimension substantially orthogonal to a vector bisecting the first and second angular positions.

In an embodiment, the first image data comprises first metadata including indicia of the first angular camera position and the GPS coordinates; and the second image data comprises second metadata including indicia of the second angular camera position and the GPS coordinates.

A method is also provided for determining a spatial attribute and a geographic location of an object visible in a cylindrical panoramic scene, comprising the steps of: mounting a camera at a fixed distance from a spindle having a spindle geographic location; recording first image data at a first angular camera position and recording second image data at a second angular camera position; determining size information for the object from the first and second image data; determining geographic information for the object from the spindle geographic location, the fixed distance, and a camera field of view (FOV); and mapping the object size information and the object geographic information onto the cylindrical panoramic scene.

In an embodiment, the spindle geographic location comprises first global positioning system (GPS) coordinates, and the object geographic location comprises second GPS coordinates.

In an embodiment, the camera includes a lens characterized by a focal length, and further wherein the FOV is a function of the focal length.

In an embodiment, the method further includes recording a plurality of image data frames corresponding to a plurality of angular camera positions, respectively; determining additional size information for a plurality of additional objects, respectively, using the plurality of image data frames; determining additional object geographic locations for the plurality of additional objects, respectively; and mapping the additional size information to the cylindrical panoramic scene at the additional object geographic locations, respectively.

In an embodiment, the method further includes deriving stereoscopic image data from the first and second image data; and determining the object size information using the stereoscopic image data.

In an embodiment, the method further includes sensing the angular position of the camera using an encoder; and using an output signal from the encoder to derive the stereoscopic image.

In an embodiment, the first image data comprises first metadata including indicia of the first angular camera position and the GPS coordinates; and the second image data comprises second metadata including indicia of the second angular camera position and the GPS coordinates.

Computer code embodied in a non-transient medium is also provided for determining the size and global positioning system (GPS) coordinates of an object, wherein the computer code, when executed by a processor, is configured to execute the steps of: determining the size of the object from first and second image data recorded at first and second angular positions, respectively, by a camera rotatably mounted at a fixed distance from a spindle; and determining the GPS coordinates of the object from the spindle GPS coordinates, the fixed distance, and a field of view (FOV) of the camera Stereo Pairs Recorded from Independent Camera Platforms The foregoing embodiments generally relate to stereoscopic techniques for mapping and measuring. The following relates to 3D visualization, particularly for cinemagraphic applications, which require precise control over the stereo base. In one embodiment, the respective flight paths of two camera-equipped drones are coordinated to produce real time stereoscopic images.

Typical rule of thumb is for the stereo base to be approximately 1/30 the distance from the camera to the object being recorded. Thus, 3D scenes on the order of one to three meters employ a stereo base in the range of three to ten centimeters. 3D scenes recorded at distances on the order of one hundred meters require a stereo base in the range of 3 meters, and 3D scenes recorded at distances on the order of one thousand meters require a stereo base in the range of 30 meters.

Physically connecting two cameras with a stereo base on the order of 30 meters or greater becomes logistically problematic. Mounting two cameras on separate drone platforms and precisely controlling their respective flight paths allows tight control of the effective stereo base, even though the two cameras are not physically connected. In an embodiment, this may be accomplished with closed loop feedback control, using a GPS signal to maintain a precise flight path (and, hence, instantaneous position) for each drone. With a constant stereo base, the attitude (orientation) of the cameras may be similarly maintained using an AHRS signal for closed loop feedback control. In this way the respective orientations of the cameras may be maintained such that the stereo base remains orthogonal to the "line" of sight.

When a straight line connecting the cameras is orthogonal to the camera lines of sight, the stereo base is equal to the distance between the cameras. However, when the camera attitudes are such that the camera lines of sight are parallel to each other but not orthogonal to the line connecting the cameras, the effective stereo base (the distance between the lines of sight) is less than the distance between the cameras. Consequently, in order to maintain the 30:1 ratio between the object distance and the stereo base, the following three parameters must be carefully coordinated: i) the distance between the first and the second camera platforms; ii) the respective camera attitudes (which define the effective stereo base); and iii) the distance between the relevant objects in the scene, on the one hand, and the camera pair on the other hand. Those skilled in the art will appreciate that software systems may be developed using: i) a real time GPS signal indicating camera position to control the drone flight paths; and ii) a real time AHRS signal indicating camera attitude to control the camera orientation.

In a preferred embodiment, one of the cameras is directly controlled (e.g., by a director, producer, field officer) and functions as the "master" camera, while the other camera is designated as the slave and is configured to follow the master by adjusting he slave's geo-location and attitude in a manner calculated to maintain the above-mentioned 30:1 ratio.

Various embodiments effectively coordinate programmed flight paths and camera attitudes of two otherwise independent camera equipped drone platforms (having GPS and AHRS instruments for real time navigation) such that much of the imagery collected simultaneously by both platforms can be used to create stereo pairs or stereoscopic movies of the scene. In one embodiment, absolute geo-spatial positioning may be obtained from GPS and AHRS units mounted on each drone, but because two like receivers may be utilized the relative (separation) accuracy will have the precision of near proximity differential GPS measurements (e.g., on the order of a few centimeters). The reason the "independent platforms" are important is that the "best" inter-axial distance between the lens axes of the two cameras that form a stereo pair depends primarily on the distance from the cameras to the subject; the further the distance, the wider the inter-axial distance must be. This is particularly important for making geo-spatial and size measurements of objects in the scene utilizing the stereoscopic content. Note that the camera shutters may be synchronized using the technique described above.

In addition, the aforementioned technique of coupling a low resolution left channel camera with a high resolution right channel camera may also be employed in the context of stereo pairs recorded from independent drone platforms having coordinated flight paths.

Referring now to FIG. 13, a system 1300 for recording stereo pairs or stereoscopic movies of a scene 1310 includes a first airborne platform (e.g., drone) 1302 having a first camera 1320 mounted thereto, and a second platform 1304 having a second camera 1350 mounted thereto. Each camera includes GPS (preferably providing a PPS signal) and AHRS instruments for real time navigation. A first field of view 1303 overlaps with a second field of view 1305 to provide stereoscopic images of an object 1312 located a distance 1340 from the cameras, with the cameras separated by a variable stereo base 1330. In the embodiment shown in FIG. 13, the stereo base distance is equal to the distance between the cameras, inasmuch as their respective lines of sight are orthogonal to a straight line connecting the cameras. However, when the cameras pivot such that their lines of sight are no longer orthogonal to a straight line extending between the cameras, one or both of the drones must compensate by reducing the stereo base distance accordingly in order to maintain an appropriate ration between the object distance 1340 and the stereo base 1330 (e.g., in the range of 20:1 to 40:1, and preferably about 30:1).

FIG. 14 depicts a system 1400 including a first camera having a first FOV 1403 and a second camera 1404 having a second FOV 1405, wherein the respective FOVs overlap in a region 1410 for which 3D visualization may be obtained for an object 1412. More particularly, a first line of sight 1420 is orthogonal to the lens plane of camera 1402, and a second line of sight 1422 is orthogonal to the lens plane of camera 1404. As the cameras tilt away from a straight line 1430 connecting them, the effective stereo base 1424 correspondingly decreases. In order to maintain the desired ration between the object distance 1440 and the effective stereo base 1410 (e.g., 30:1), the flight paths of one or both platforms mat be adjusted to reduce either the object distance 1440, the stereo base 1424, or a combination of both. In a various embodiments, flight adjustments and camera attitudes may be implemented in real time under the direction of an administrator, in accordance with predetermined flight paths, or a hybrid control scheme which permits ad hoc adjustments to the foregoing parameters, preferably facilitated by real time feedback control of position and/or attitude information from GPA and/or AH RS instrumentation.

FIG. 15 is a flow diagram of an exemplary process 1500 for maintaining a substantially constant ration between an object distance and a stereo base distance. More particularly, the process 1500 includes pivotably mounting first and second cameras onto first and second airborne platforms, respectively (Task 1502); and configuring the first and second platforms to fly first and second flight paths, respectively, and configuring the first and second cameras to maintain respective attitudes which maintain a substantially constant ratio between the object distance and the stereo base (Task 1504). The method 1500 further involves recording first and second overlapping images from the first and second cameras, respectively (Task 1506); and constructing a stereoscopic image from the first and second overlapping images (Task 1508).

A method is provided for constructing a stereoscopic image of an object, comprising: pivotably mounting first and second cameras onto first and second airborne platforms, respectively; programming the first and second platforms to fly first and second flight paths, respectively; recording first and second overlapping images from said first and second cameras, respectively, of the object at an object distance; and constructing the stereoscopic image from the first and second overlapping images; wherein the first and second flight paths are configured to maintain a substantially constant ratio between: i) the object distance; and ii) a stereo base distance between the first and second cameras.

In an embodiment, the method further includes: providing the first and second platforms with first and second global positioning system (GPS) receivers configured to output first and second GPS signals, respectively; and using the first and second GPS signals as active feedback to control the first and second flight paths, respectively.

In an embodiment, the method further includes: providing the first camera with a first attitude and heading reference system (AHRS) receiver configured to output a first AHRS signal; and using the first AHRS signal to control a first parameter associated with the first platform.

In an embodiment, the first parameter comprises one of: i) the first camera attitude; and ii) the first flight path.

In an embodiment, the method further includes: providing the first and second cameras with a first and second AHRS receivers configured to output first and second AHRS signals, respectively; and using at least one of the first and second AHRS signals to adjust one of: i) the stereo base distance; and ii) the object distance.

In an embodiment, the method further includes: using at least one of the first and second AHRS signals to control one of: i) the second flight path; and ii) the second camera attitude.

In an embodiment, the method further includes: providing the first and second platforms with first and second global positioning system (GPS) receivers configured to output first and second GPS signals including a pulse-per-second (PPS) signal component, respectively; and using the PPS signal component to synchronize the timing of the recording of the first and second overlapping images.

In an embodiment, the substantially constant ratio is in the range of about 30:1.

In an embodiment, the first camera has a first line of sight and the second camera has a second line of sight, and the method further includes: maintaining the first line of sight substantially parallel to the second line of sight while recording the first and second overlapping images.

In an embodiment, the first flight path comprises a dynamically configurable master path, and the second flight path is configured as a slave to follow the first flight path.

A system is also provided for constructing a stereoscopic image of an object located at an object distance from first and second cameras, the system comprising: a first drone supporting the first camera and having a first controller configured to execute a first flight path; a second drone supporting the second camera and having a second controller configured to execute a second flight path; and a processor configured to construct the three-dimensional image from a first image received from the first camera and a second image received from the second camera; wherein the first and second controllers are configured to coordinate the first and second flight paths to maintain a substantially constant ratio between: i) the object distance; and ii) a stereo base distance separating the first and second cameras.

In an embodiment, the ratio is in the range of 30:1.

In an embodiment, the first camera is characterized by a first line of sight orthogonal to a first camera lens plane; the second camera is characterized by a second line of sight orthogonal to a second camera lens plane; and the stereo base distance comprises the distance between the first and second lines of sight.

In an embodiment, the first camera includes a first GPS receiver configured to output a first GPS signal; the second camera includes a second GPS receiver configured to output a second GPS signal; the first controller employs closed loop feedback using the first GPS signal to execute the first flight path; and the second controller employs closed loop feedback using the second GPS signal to execute the second flight path.

In an embodiment, the first camera includes a first AH RS module configured to output a first AHRS signal; the second camera second AHRS module configured to output a second AHRS signal; the first controller employs closed loop feedback using the first AHRS signal to control the attitude of the first camera; and the second controller employs closed loop feedback using the second AHRS signal to control the attitude of the second camera.

In an embodiment, the first and second GPS signals include a PPS component, and the PPS component is used to synchronize the recording of the first and second images.

In an embodiment, the first image comprises a frame in a first video sequence; the second image comprises a frame in a second video sequence; and the stereoscopic image comprises a composite frame in a stereoscopic video sequence.

In an embodiment, the first and second controllers are configured to coordinate the respective attitudes of the first and second cameras to maintain a substantially constant ratio between: i) the object distance; and ii) a stereo base distance separating the first and second cameras.

A method is also provided for using the geospatial position and attitude of a master camera mounted on a master drone to control the geospatial position and attitude of a slave camera mounted on a slave drone, the method comprising the steps of: receiving, at a processor, first GPS coordinates from the first camera; determining, based on the first GPS coordinates, second GPS coordinates to maintain a predetermined ratio between an object distance and a stereo base associated with the first and second cameras; and adjusting a flight path of the slave drone based on the second GPS coordinates.

In an embodiment, the method further includes: receiving, at a processor, first AHRS values associated with the first camera; determining, based on the first AH RS values, second AHRS values to maintain the predetermined ratio; and adjusting the attitude of the second camera based on the second AH RS values.

Time Lapse Movies Assembled from Videos Recorded during Repetitive Scene Sweeps by a Single Drone In accordance with a further aspect of the invention, a single drone may be flown in a consistent path with a consistently varied camera attitude along the path periodically in time. For instance, daily flights along the same path at the same solar time each day would produce essentially the same video or photographic result each day, if nothing in the scene changes. However, if the scene changes over time, such as the construction of a bridge or building, then a time-lapse movie, or many such movies can be assembled from frames taken from each individual video at the same location along the path to create time-lapse videos from any, or every, position along the consistent flight path. Frames from various positions may be assembled in such a way that as the camera's perspective changes along the path, the bridge or building can be seen "growing" into existence. Applications are varied from entertainment, to advertising, to "as built" documentation of complex constructions.

Alternatively, time-lapse stereoscopic movies for visualization and measurement can be constructed using stereo pairs extracted from the motion of the single drone camera in regions where the motion along the flight path is "designed" to optimize the affect. Of course with a single camera some temporal rivalry may be expected do to motion in the scene, but in a great many situations this will not be a significant limitation, particularly if high frame rate video is recorded and flight speeds chosen to reduce the anticipated rivalry.

Extrapolating the foregoing, at 30 frames/second, for a 60 video the present invention could produce up to (60× 30=1800) 1800 individual "transverse" movies. When viewing the resulting scene, one can dynamically freeze the perspective (point of view) by toggling among the various transverse movies, referred to herein as "surfing within the transverse time domain." That is, sequentially viewing the 1800 frames of a particular 60 second video in its entirety may be thought of as moving through geo-space at a particular time, whereas viewing a sequence of frames stitched together from successive videos (a transverse movie) may be thought of as moving through time from a particular point in geo-space. When surfing within the transverse time domain, one may view a scene as it changes over time from various perspectives, without compromising the continuity of the original scene as it was recorded over time.

Referring now to FIG. 16A-D, an exemplary scene 1600 is depicted as it changes over time, such as when a structure (e.g., a bridge) is built. In a straightforward use case, the bridge is built over a period of four regular time units, such as solar days. On the first day, a drone flies a first flight path 1604 with an on-board camera exhibiting a predetermined or otherwise known camera attitude at each position over the course of the flight. During the first drone pass, a first video (V1) 1604 is recorded of a road 1602. On the second day (FIG. 16B), the drone traverses the same flight path exhibiting the same camera attitude and records a second video (V2) 1606, capturing a first embankment 1612 which has been constructed adjacent the road 1602.

During a third drone pass, the drone traverses the same flight path exhibiting the same camera attitude and records a third video (V3) 1608, capturing a second embankment 1614 constructed on the other side of the road 1602. During a fourth drone pass, the drone traverses the same flight path exhibiting the same camera attitude and records a fourth video (V4) 1610, capturing a beam 1616 connecting the first and second embankments 1612, 1614.

With continued reference to FIGS. 16A-D, during each drone pass, the drone appears momentarily—or more precisely, instantly—at a first position P1 during a first segment of the flight path, and thereafter at a second position P2 at a subsequent segment of the flight path, and thereafter at a third position P3, and finally at a fourth position P4 during a final segment of the flight path. As described in greater detail below, a first frame may be extracted from each video V1-V4 at position P1 and stitched together to construct a first time lapse transverse movie M1 of the scene as viewed from position P1. A second frame may be extracted from each video V1-V4 at position P2 and stitched together to construct a second time lapse transverse movie M2 of the scene as viewed from position P2, and so on. Indeed, any number of time lapse transverse movies may be constructed, up to and including the total number of frames comprising each original video V1-V4.

Upon review of the recorded scene, the viewer may progress through geo-space from positions P1 through P4 (and all positions in between positions P1-P4), switching between the various videos V1-V4 without loss of continuity. In addition, the viewer may change perspectives between positions P1-P4 by switching back and forth between movies M1-M4, effectively "freezing" the geo-spatial position from which the scene is viewed, without loss of continuity. That is, by stitching together similarly positioned frames from each of the various original videos, the scene may be virtually recorded from any number of "static" positions, and subsequently viewed from those "static" positions.

FIG. 17 graphically depicts a plurality of original videos V1-Vj, each comprising a plurality of frames F1-Fn, with each video corresponding to a discrete drone pass over a scene. That is, a first video V1 comprises frames F1-Fn recorded within a first time window T1; a second video V2 comprises frames F1-Fn recorded within a second time window T2, and so on. Videos V1-Vj may be simultaneously replayed, allowing the viewer to switch back and forth among the videos, much like viewing an instant replay of a sporting event from different cameras without compromising the continuity of the recorded scene.

By maintaining a consistent flight path and camera attitude during each drone pass, each first frame F1 from each video may be stitched together to form a first movie M1 comprising frames V1F1, V2F1 ... VjF1; each second frame F2 from each video may be stitched together to form a second movie M2 comprising frames V1F2, V2F2 ... VjF2, and so on up to and including a movie Mn comprising the sequence of frames V1Fn, V2Fn ... VjFn. In this way, the viewer may also view time lapse movies M1-Mn from any position within the flight path.

FIG. 18 is a flow diagram of an exemplary process 1800 for assembling image frames together from successive videos to create a time lapse movie using a single drone successively flying a consistent flight path with a consistently varied camera attitude periodically in time. The method 1800 includes executing the consistent flight path j times while recording j videos, respectively, with each video comprising n frames (Task 1802); appending the first frame of each of the j videos together to yield a first movie (Task 1804); appending the n-th frame of each of the j videos together to yield an n-th movie (Task 1806); and selectively toggling back and forth among the various j videos and n movies without loss of continuity (Task 1808).

In an alternate embodiment, successive frames within a particular video may be parsed into stereo pairs, and used to construct a stereographic video of the scene. By constructing a plurality of stereographic videos from each of a plurality of drone passes, a series of stereographic frames from each video may be stitched together into a stereographic movie of the scene from a particular position, as explained above.

A method of constructing a time lapse movie is thus provided, comprising: recording a first video of a scene while traversing a predetermined path with a camera exhibiting a known attitude during a first time window; recording a second video of the scene while traversing the predetermined path with the known attitude during a second time window; identifying a first frame at a first position within the first video; identifying a first frame at a first position within the second video; and stitching the first frame from the first video together with the first frame from the second video to form a first time lapse movie.

In an embodiment, the first time window comprises a first unit of time within a first solar day, and the second time window comprises the first unit of time within a second solar day.

In an embodiment, the first and second solar days comprise successive days.

In an embodiment, the method further includes identifying a second frame at a second position within the first video; identifying a second frame at a second position within the second video; and stitching the second frame from the first video together with the second frame from the second video to form a second time lapse movie.

In an embodiment, the method further includes; constructing a first stereoscopic image from the first and second frames of the first video; constructing a second stereoscopic image from the first and second frames of the second video; and stitching the first stereoscopic image together with the second stereoscopic image to form a stereographic time lapse movie.

In an embodiment, the method further includes using a GPS signal received from a GPS device associated with the camera to maintain the predetermined path.

In an embodiment, the method further includes using a pulse-per-second (PPS) signal received at the camera to synchronize the recording of the first frame of the first video with the recording of the first frame of the second video.

In an embodiment, the method further includes using a altitude and heading reference (AHRS) signal received at the camera to maintain the known attitude while recording the first and second videos.

In an embodiment, the method further includes: recording a j-th video of the scene while traversing the predetermined path with the known attitude during a j-th time window; identifying a first frame at a first position within the j-th video; and stitching the first frame from the first video together with the first frame from the second video and the first frame from the j-th video to form the first time lapse movie.

In an embodiment, the method further includes mounting the camera to an airborne platform, such that traversing the predetermined path comprises executing a predetermined flight path.

In an embodiment, the known attitude comprises a constant attitude.

In an embodiment, the known attitude comprises a variable attitude.

A system is also provided for constructing a time lapse movie of a scene, the system comprising: a drone having a video camera pivotably mounted thereon; a control circuit configured to: fly the drone along a consistent flight path during respective first and second passes over the scene; maintain a consistent camera attitude during the first and second passes; record a first video during the first pass and a second video during the second pass; and append a first frame of the first video to a first frame of the second video to form a first time lapse movie.

In an embodiment,the control circuit is configured to execute the first and second flight paths at the same solar times on consecutive solar days.

In an embodiment, the camera comprises a GPS receiver configured to receive a GPS signal from an external source; and the control circuit is configured to execute the consistent flight path using the GPS signal in a closed feedback control loop.

In an embodiment, the camera comprises an AHRS device configured to output an AHRS signal; and the control circuit is configured to maintain the consistent camera attitude using the AHRS signal in a closed feedback control loop.

In an embodiment, the GPS receiver comprises a PPS pin configured to output a PPS signal component to the control circuit; and the control circuit is configured to synchronize the first frame of the first video to the first frame of the second video using the PPS signal.

In an embodiment, the control circuit is further configured to: record a j-th video during a j-th pass over the scene; and append a first frame from the j-th video to the first time lapse movie.

In an embodiment, the control circuit is further configured to selectively switch among the first video, the second video, and the first movie during playback.

A method of using a single drone successively flying a consistent flight path with a consistently varied camera attitude periodically in time to produce a time lapse movie is provided. The method includes: executing the consistent flight path j times while recording j videos, respectively, each video comprising n frames; appending the first frame of each of the j videos together to yield a first movie; and appending the n-th frame of each of the j videos together to yield an n-th movie.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed:

1. A camera comprising:
a lens;
a recording plane;
a shutter configured to selectively pass photons from the lens to the recording plane;
a global positioning system (GPS) chip configured to receive a periodic timing pulse from an external source; and
a processor configured to actuate the shutter in response to the timing pulse;
wherein the periodic timing pulse comprises a regular repeating series of timing signals each having a duration of about 100 milliseconds; and
wherein each timing signal comprises a rising edge having a duration in the range of one nanosecond to one picosecond.

2. The camera of claim 1, wherein the GPS chip comprises a pulse per second (PPS) pin at which the periodic timing pulse appears.

3. The camera of claim 2, wherein the external source comprises a plurality of GPS satellites.

4. The camera of claim 2, wherein the processor is configured to actuate the shutter responsive to a rising edge of the timing pulse.

5. The camera of claim 4, wherein the processor is configured to:
execute a sequence of instructions including a shutter actuation instruction; and
go to the shutter actuation instruction immediately upon detecting the timing pulse.

6. The camera of claim 1, wherein the recording plane comprises a photosensitive medium.

7. The camera of claim 6, wherein the photosensitive medium comprises one of: i) film; and ii) an array of digital pixels.

8. The camera of claim 1, wherein the recording plane is configured to capture a still photographic image.

9. The camera of claim 1, wherein the recording plane is configured to capture a series of video frames.

10. A method of controlling the actuation of a camera shutter, the method comprising:
equipping the camera with a timing module configured to receive a periodic timing signal from a source external to the camera;
detecting a leading edge of a unique pulse of the timing signal; and
in response to detecting the leading edge actuating the shutter;
wherein:
the duration of each timing pulse is about 100 milliseconds; and
the duration of the leading edge is in the range of one nanosecond to one picosecond.

11. The camera of claim 10, wherein the GPS chip further comprises a data pin configured to present GPS coordinate data in the range of 100 to 500 milliseconds following each periodic timing pulse.

12. The method of claim 10, wherein:
the timing module comprises a global positioning signal (GPS) receiver including a timing output pin; and
the periodic timing signal comprises a pulse-per-second (PPS) signal presented at the timing output pin.

13. The method of claim 10, wherein actuating the shutter comprises exposing a photosensitive medium.

14. A method of synchronizing the operation of a first shutter of a first camera with the operation of a second shutter of a second camera without a physical tether between the first and second cameras, comprising the steps of:
receiving a first signal from a remote global positioning system (GPS);
generating, in response to the first signal, a pulse-per-second (PPS) signal at the first and second cameras; and
in response to a unique timing pulse embodied within the PPS signal, simultaneously actuating the first and second shutters.

15. The method of claim 14, further comprising:
prior to the receipt of the unique timing pulse, receiving, at the first and second cameras, an instruction to actuate a respective shutter when the unique timing pulse is subsequently received.

16. The method of claim 14, wherein simultaneously actuating comprises executing respective actuation instructions at both cameras in response to detecting the rising edge of the unique timing pulse.

* * * * *